United States Patent
Yasuoka et al.

(10) Patent No.: US 12,036,624 B2
(45) Date of Patent: Jul. 16, 2024

(54) WELDING METHOD AND WELDING APPARATUS

(71) Applicant: FURUKAWA ELECTRIC CO., LTD., Tokyo (JP)

(72) Inventors: Tomomichi Yasuoka, Tokyo (JP); Takashi Kayahara, Tokyo (JP); Toshiaki Sakai, Tokyo (JP); Ryosuke Nishii, Tokyo (JP); Takashi Shigematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/558,527

(22) Filed: Sep. 3, 2019

(65) Prior Publication Data
US 2019/0389001 A1  Dec. 26, 2019

Related U.S. Application Data

(63) Continuation of application No. PCT/JP2018/008353, filed on Mar. 5, 2018.

(30) Foreign Application Priority Data

Mar. 3, 2017  (JP) .................................. 2017-040065
Mar. 31, 2017 (JP) .................................. 2017-069704

(51) Int. Cl.
*B23K 26/06* (2014.01)
*B23K 26/21* (2014.01)

(52) U.S. Cl.
CPC ...... *B23K 26/0608* (2013.01); *B23K 26/0648* (2013.01); *B23K 26/21* (2015.10)

(58) Field of Classification Search
CPC . B23K 26/0608; B23K 26/21; B23K 26/0648
(Continued)

(56) References Cited

U.S. PATENT DOCUMENTS 4,390,774 A * 6/1983 Steen .................. B23K 26/083
                                                   219/121.84
5,272,309 A   12/1993 Goruganthu et al.
(Continued)

FOREIGN PATENT DOCUMENTS

CN    102476242 A    5/2012
CN    103056523 A    4/2013
(Continued)

OTHER PUBLICATIONS

R.G. Waltenberg and W.W. Coblentz, Reflective Properties [online], Retrieved from the Internet: <https://nvlpubs.nist.gov/nistpubs/ScientificPapers/nbsscientificpaper363vol15_A2b.pdf> pp. 653, 655. Year (1899).*

(Continued)

*Primary Examiner* — Jimmy Chou
(74) *Attorney, Agent, or Firm* — Oblon, McClelland, Maier & Neustadt, L.L.P.

(57) ABSTRACT

A method of welding a workpiece by using a laser is provided which includes disposing a workpiece in a region to be irradiated with laser light from a laser oscillator; and irradiating the workpiece with the laser light from the laser oscillator such that an irradiated portion of the workpiece is melted and welded while sweeping the laser light over the workpiece by relatively moving the laser light and the workpiece. The laser light is formed of a main beam and an auxiliary beam, at least part of the auxiliary beam being disposed anteriorly in a sweep direction, and the main beam has a power density equal to or greater than a power density of the auxiliary beam.

13 Claims, 12 Drawing Sheets

(58) Field of Classification Search
USPC ....... 219/121.67, 121.72, 74, 121.64, 121.63
See application file for complete search history.

(56) References Cited

U.S. PATENT DOCUMENTS

| | | | | |
|---|---|---|---|---|
| 5,821,493 | A * | 10/1998 | Beyer | B23K 26/348 |
| | | | | 219/121.46 |
| 5,866,870 | A * | 2/1999 | Walduck | B23K 28/02 |
| | | | | 219/121.45 |
| 5,914,055 | A * | 6/1999 | Roberts | B23P 6/007 |
| | | | | 219/76.15 |
| 5,922,224 | A * | 7/1999 | Broekroelofs | B23K 26/067 |
| | | | | 219/121.72 |
| 5,932,121 | A * | 8/1999 | Manabe | B23K 9/08 |
| | | | | 219/123 |
| 6,169,631 | B1 * | 1/2001 | Xuan | B23K 26/0604 |
| | | | | 216/22 |
| 6,191,379 | B1 * | 2/2001 | Offer | B23K 9/0213 |
| | | | | 219/121.63 |
| 6,316,743 | B1 * | 11/2001 | Nagahori | B23K 26/123 |
| | | | | 219/121.72 |
| 6,469,277 | B1 * | 10/2002 | Trube | B23K 26/1429 |
| | | | | 219/121.63 |
| 6,501,047 | B1 * | 12/2002 | Xuan | B23K 26/0608 |
| | | | | 219/121.69 |
| 6,608,278 | B1 * | 8/2003 | Xie | B23K 26/0608 |
| | | | | 219/121.64 |
| 6,720,519 | B2 * | 4/2004 | Liu | B23K 26/04 |
| | | | | 219/121.61 |
| 7,022,939 | B2 * | 4/2006 | Yahaba | B23K 15/0066 |
| | | | | 219/121.64 |
| 7,705,265 | B2 | 4/2010 | Asakura et al. | |
| 8,198,566 | B2 * | 6/2012 | Baird | B23K 26/0624 |
| | | | | 219/121.69 |
| 8,278,587 | B2 * | 10/2012 | Zhang | B23K 9/1735 |
| | | | | 219/121.45 |
| 8,319,148 | B2 * | 11/2012 | Nowak | B23P 6/007 |
| | | | | 219/121.76 |
| 8,450,638 | B2 * | 5/2013 | Kajikawa | B23K 26/0608 |
| | | | | 219/121.6 |
| 8,653,406 | B2 * | 2/2014 | Gubler | B23K 26/066 |
| | | | | 219/121.62 |
| 8,729,424 | B2 * | 5/2014 | Lin | B23K 26/348 |
| | | | | 219/121.64 |
| 8,791,384 | B2 * | 7/2014 | Wang | B23K 26/1423 |
| | | | | 219/74 |
| 9,044,824 | B2 * | 6/2015 | Olsen | B23K 26/142 |
| 9,266,195 | B2 * | 2/2016 | Yano | B23K 26/26 |
| 9,364,921 | B2 * | 6/2016 | Yano | B23K 26/32 |
| 9,705,111 | B2 * | 7/2017 | Umeyama | B23K 26/20 |
| 10,155,285 | B2 * | 12/2018 | Fujiwara | B25J 11/005 |
| 10,828,720 | B2 * | 11/2020 | Tsai | B23K 26/0604 |
| 2001/0047988 | A1 * | 12/2001 | Hiraoka | B23K 9/092 |
| | | | | 219/137 PS |
| 2002/0030043 | A1 * | 3/2002 | Tong | B23K 9/124 |
| | | | | 219/130.33 |
| 2002/0060210 | A1 * | 5/2002 | Terada | B23K 26/0676 |
| | | | | 219/121.76 |
| 2002/0149136 | A1 * | 10/2002 | Baird | B23K 26/083 |
| | | | | 264/400 |
| 2003/0006221 | A1 * | 1/2003 | Hong | H01L 21/3043 |
| | | | | 219/121.72 |
| 2004/0118818 | A1 * | 6/2004 | Oda | B23K 26/24 |
| | | | | 219/121.64 |
| 2004/0142607 | A1 | 7/2004 | Asakura et al. | |
| 2004/0200813 | A1 * | 10/2004 | Alips | B23K 26/067 |
| | | | | 219/121.63 |
| 2005/0028897 | A1 * | 2/2005 | Kurz | B23K 26/0608 |
| | | | | 148/525 |
| 2007/0108166 | A1 * | 5/2007 | Jennings | B23K 26/0665 |
| | | | | 219/121.8 |
| 2008/0011720 | A1 * | 1/2008 | Briand | B23K 26/32 |
| | | | | 219/61 |
| 2008/0116175 | A1 * | 5/2008 | Ballerini | B23K 26/0604 |
| | | | | 219/74 |
| 2008/0290078 | A1 * | 11/2008 | Nomaru | B23K 26/042 |
| | | | | 219/121.67 |
| 2010/0044353 | A1 * | 2/2010 | Olsen | B23K 26/082 |
| | | | | 219/121.72 |
| 2010/0072178 | A1 * | 3/2010 | Ramsayer | B23K 26/073 |
| | | | | 219/121.64 |
| 2010/0089882 | A1 * | 4/2010 | Tamura | C03B 33/093 |
| | | | | 219/121.69 |
| 2010/0140237 | A1 * | 6/2010 | Unrath | B23K 26/382 |
| | | | | 219/121.72 |
| 2010/0187207 | A1 * | 7/2010 | Lee | B23K 26/364 |
| | | | | 219/121.72 |
| 2010/0288738 | A1 * | 11/2010 | Jones | B23K 26/22 |
| | | | | 219/121.63 |
| 2010/0326962 | A1 * | 12/2010 | Calla | B23K 9/0956 |
| | | | | 219/76.14 |
| 2011/0042361 | A1 * | 2/2011 | Nowak | B23P 6/007 |
| | | | | 219/121.64 |
| 2011/0095003 | A1 * | 4/2011 | Sakurai | B23K 1/0056 |
| | | | | 219/121.64 |
| 2011/0132878 | A1 * | 6/2011 | Wang | B23K 26/348 |
| | | | | 219/74 |
| 2011/0198317 | A1 * | 8/2011 | Lin | B23K 15/006 |
| | | | | 219/73 |
| 2011/0215074 | A1 * | 9/2011 | Wang | B23K 26/0608 |
| | | | | 219/121.64 |
| 2012/0000892 | A1 * | 1/2012 | Nowak | B23K 26/26 |
| | | | | 219/121.64 |
| 2012/0006795 | A1 * | 1/2012 | Nowak | B23K 26/26 |
| | | | | 219/121.64 |
| 2012/0018412 | A1 * | 1/2012 | Ito | B23K 26/0853 |
| | | | | 219/121.67 |
| 2012/0055909 | A1 | 3/2012 | Miyake et al. | |
| 2012/0223061 | A1 * | 9/2012 | Atsumi | B23K 26/0617 |
| | | | | 219/121.72 |
| 2012/0273470 | A1 * | 11/2012 | Zediker | B23K 26/142 |
| | | | | 219/121.61 |
| 2013/0170515 | A1 * | 7/2013 | Watanabe | B23K 26/0608 |
| | | | | 372/50.23 |
| 2013/0309000 | A1 * | 11/2013 | Lin | B23K 26/0676 |
| | | | | 403/270 |
| 2014/0008334 | A1 * | 1/2014 | Ash | B23K 26/20 |
| | | | | 219/121.64 |
| 2014/0027413 | A1 * | 1/2014 | Lin | B23K 26/348 |
| | | | | 219/121.64 |
| 2014/0027414 | A1 * | 1/2014 | Lin | B23K 26/348 |
| | | | | 219/121.64 |
| 2014/0042131 | A1 * | 2/2014 | Ash | B23K 35/02 |
| | | | | 219/121.66 |
| 2014/0124481 | A1 * | 5/2014 | Yano | B23K 26/0608 |
| | | | | 219/59.1 |
| 2014/0175069 | A1 * | 6/2014 | Yano | B23K 26/0608 |
| | | | | 219/121.64 |
| 2014/0263191 | A1 * | 9/2014 | Zapata | B23K 9/164 |
| | | | | 219/74 |
| 2014/0291297 | A1 * | 10/2014 | Chen | B23K 10/02 |
| | | | | 219/74 |
| 2014/0374391 | A1 * | 12/2014 | Cole | B23K 9/124 |
| | | | | 219/121.45 |
| 2015/0224597 | A1 | 8/2015 | Olsen | |
| 2015/0349303 | A1 * | 12/2015 | Umeyama | B23K 26/20 |
| | | | | 429/163 |
| 2016/0016261 | A1 * | 1/2016 | Mudd, II | B23K 26/32 |
| | | | | 219/121.61 |
| 2016/0114428 | A1 * | 4/2016 | Wang | B23K 26/211 |
| | | | | 427/554 |
| 2016/0259174 | A1 * | 9/2016 | Simon | G02B 27/0905 |
| 2016/0288252 | A1 * | 10/2016 | Kritikos | B23K 26/352 |
| 2016/0318129 | A1 * | 11/2016 | Hu | B29C 64/282 |
| 2016/0346870 | A1 * | 12/2016 | Sans Ravellat | B41J 2/475 |
| 2016/0346875 | A1 * | 12/2016 | Bruck | H01S 3/0608 |
| 2017/0063024 | A1 * | 3/2017 | Kakizaki | H01L 21/67115 |
| 2017/0248793 | A1 * | 8/2017 | Sukhman | G02B 27/106 |
| 2017/0304943 | A1 * | 10/2017 | Tsukui | B23K 26/206 |

(56) References Cited

U.S. PATENT DOCUMENTS

| | | | |
|---|---|---|---|
| 2018/0065207 A1* | 3/2018 | Hammer | B23K 26/0604 |
| 2018/0236600 A1* | 8/2018 | Vila I Ferrer | B23K 35/282 |
| 2018/0361506 A1* | 12/2018 | Tateyama | B23K 26/0608 |
| 2019/0096763 A1* | 3/2019 | Matsuo | H01L 21/78 |
| 2019/0344348 A1* | 11/2019 | Nakamura | B29C 64/268 |
| 2019/0389001 A1* | 12/2019 | Yasuoka | B23K 26/21 |
| 2021/0053152 A1* | 2/2021 | Vierstraete | B23K 26/073 |

FOREIGN PATENT DOCUMENTS

| | | | | |
|---|---|---|---|---|
| DE | 102011016579 A1 * | 11/2011 | | B23K 26/0608 |
| JP | S63-295093 | 12/1988 | | |
| JP | H05-104276 A | 4/1993 | | |
| JP | 07-21 4369 A | 8/1995 | | |
| JP | 07-214369 A | 8/1995 | | |
| JP | 2002160083 A * | 4/2002 | | |
| JP | 2002-160083 A | 6/2002 | | |
| JP | 2002-160083 A1 | 6/2002 | | |
| JP | 2002-301583 A1 | 10/2002 | | |
| JP | 2003-94184 A | 4/2003 | | |
| JP | 2004-192948 A | 7/2004 | | |
| JP | 2004-358521 A | 12/2004 | | |
| JP | 2004-358521 A1 | 12/2004 | | |
| JP | 2008-114276 A | 5/2008 | | |
| JP | 2008-246502 A1 | 10/2008 | | |
| JP | 2010-508149 A | 3/2010 | | |
| JP | 2012-110905 A | 6/2012 | | |
| JP | 2012-110905 A1 | 6/2012 | | |
| JP | 2012110905 A * | 6/2012 | | |
| JP | 2013-220462 A | 10/2013 | | |
| JP | 5496370 B2 | 5/2014 | | |
| JP | 2015-205327 A | 11/2015 | | |
| JP | 2015-205327 A1 | 11/2015 | | |
| JP | 2015-217422 A | 12/2015 | | |
| JP | 2016-73983 A | 5/2016 | | |
| JP | 2016-173472 A | 9/2016 | | |
| JP | 2016-173472 A1 | 9/2016 | | |
| JP | 2017-35721 A | 2/2017 | | |
| WO | WO 2010/131298 A1 | 11/2010 | | |
| WO | 2015189883 A1 | 12/2015 | | |

OTHER PUBLICATIONS

Extended European Search Report issued Apr. 9, 2021 in European Patent Application No. 18761249.4, 7 pages.
International Search Report issued Apr. 3, 2018 in PCT/JP2018/008353 filed Mar. 5, 2018 (with English Translation).
Written Opinion issued Apr. 3, 2018 in PCT/JP2018/008353 filed Mar. 5, 2018.
International Search Report issued April 3, 208 in PCT/JP2018/008353 filed Mar. 5, 2018 (with English Translation).
Written Opinion issued April 3, 208 in PCT/JP2018/008353 filed Mar. 5, 2018.
Japanese Office Action issued Jul. 7, 2020 in Japanese Patent Application No. 2019-503169 (with unedited computer generated English translation), 22 pages.
Combined Chinese Office Action and Search Report issued Jan. 5, 2021 in corresponding Chinese Patent Application No. 201880015422.2 (with English Translation and English Translation of Category of Cited Documents), 31 pages.
Canadian Office Action dated Oct. 19, 2021 in Canadian Application No. 3,055,275, 12 pages.
Combined Chinese Office Action and Search Report issued Aug. 30, 2021 in corresponding Chinese Patent Application No. 201880015422.2 (with English Translation and English Translation of Category of Cited Documents), 30 pages.
Chinese Office Action issued Apr. 24, 2022 in Chinese Patent Application No. 201880015422.2 (with unedited computer generated English translation), 29 pages.
Canadian Office Action issued Apr. 21, 2022 in Canadian Patent Application No. 3,055,275; 8 pages.
Japanese Office Action dated Mar. 29, 2022 in Japanese Patent Application No. 2021-081019 with English machine translation thereof, 9 pages.
European Office Action dated Apr. 4, 2023, issued in corresponding European Application No. 18761249.4, 5 pages.
Office Action dated Dec. 13, 2022 in corresponding Japanese Application No. 2021-081019, w/English machine translation; 9 pages.
Office Action dated Dec. 14, 2022 in corresponding Chinese Application No. 201880015422.2, w/English machine translation; 29 pages.
Canadian Office Action and Search Report issued May 31, 2023 in Canadian Application 3055275, 7 pages.
Dictionary of Scientific and Technical Terms, "Blue", McGraw-Hill, 1st Edition, Mar. 20, 1979, 3 pages (with Partial English Machine Translation).
Ryohei et al., "Characteristics of Blue Laser Absorption and Its Hardening", Preprints of the National Meeting of Japan Welding Society, vol. 99, 2016, 15 pages (with Partial English Machine Translation).
Notice of Reasons for Revocation Report in Japanese patent application No. 2021-081019, with English machine translation thereof, 44 pages.

* cited by examiner

B ← → A

WELDING METHOD AND WELDING APPARATUS

CROSS-REFERENCE TO RELATED APPLICATION(S)

This application is a continuation of International Application No. PCT/JP2018/008353, filed on Mar. 5, 2018 which claims the benefit of priorities of the prior Japanese Patent Applications No. 2017-040065, filed on Mar. 3, 2017 and No. 2017-069704, filed on Mar. 31, 2017, the entire contents of which are incorporated herein by reference.

BACKGROUND

The disclosure relates to a welding method and a welding apparatus.

Laser welding is known as a technique for welding a metal material such as iron and copper. Laser welding is a welding method including irradiating a welding portion of a workpiece with laser light and melting the welding portion by energy of the laser light. A liquid pool of molten metal material called a "molten pool" is formed in the welding portion irradiated with the laser light, and subsequently the metal material in the molten pool solidifies. In this way, the welding is performed.

In addition, when a workpiece is irradiated with laser light, a profile of the laser light may be formed according to purposes of irradiation. For example, for a case where the laser light is used to cut a workpiece, a technique for forming a profile of laser light is known (see, for example, Japanese translation of PCT international application No. 2010-508149).

In the related art, an output of a laser-light generation apparatus is low, and hence, laser welding is used for a metal material having a low reflectivity (high absorption rate). However, in recent years, light condensing performance of the laser-light generation apparatus has improved, and hence, laser welding is increasingly used for also a metal material having a high reflectivity such as copper and aluminum (see, for example, Japanese Laid-open Patent Publications Nos. H07-214369 and 2004-192948, and International Patent Publication WO2010/131298).

SUMMARY

According to a first aspect of this disclosure, a method of welding a workpiece by using a laser is provided. The method includes disposing a workpiece in a region to be irradiated with laser light from a laser oscillator; and irradiating the workpiece with the laser light from the laser oscillator such that an irradiated portion of the workpiece is melted and welded while sweeping the laser light over the workpiece by relatively moving the laser light and the workpiece. The laser light is formed of a main beam and an auxiliary beam, at least part of the auxiliary beam being disposed anteriorly in a sweep direction, and the main beam has a power density equal to or greater than a power density of the auxiliary beam.

According to a second aspect of the disclosure, a laser welding apparatus welding a workpiece by using a laser is provided which includes a laser oscillator; and an optical head that is optically connectable with the laser oscillator such that the optical head receives laser light from the laser oscillator, generates a main beam and an auxiliary beam from the received laser light, the main beam having a power density equal to or greater than a power density of the auxiliary beam, and irradiates a workpiece with the main beam and the auxiliary beam to melt and weld an irradiated portion of the workpiece. The optical head is configured to be movable relatively to the workpiece such that the laser light is caused to sweep over the workpiece, and at least part of the auxiliary beam is disposed anteriorly in a sweep direction.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
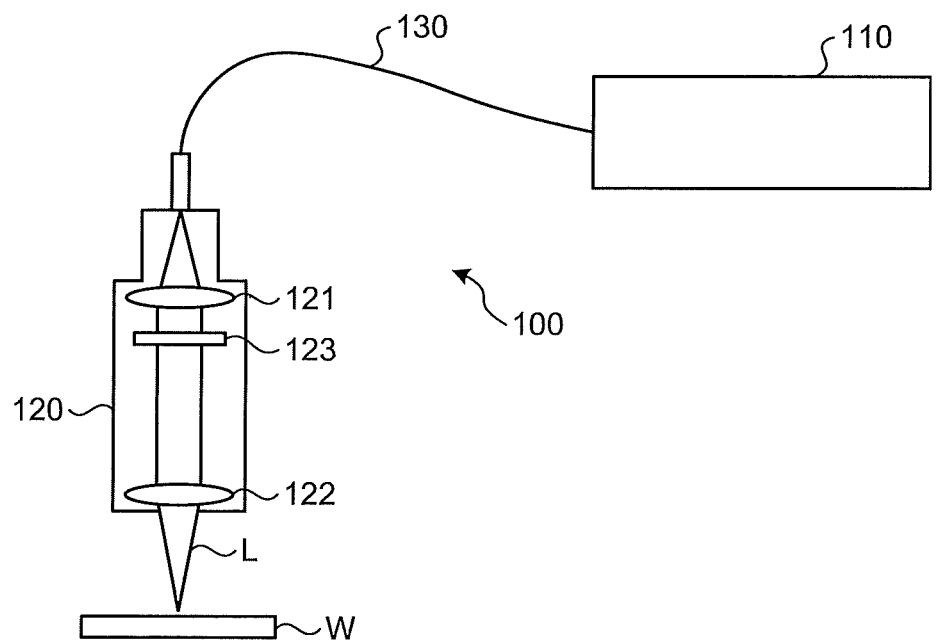
FIG. 1 is a view illustrating a schematic configuration of a welding apparatus according to a first embodiment.

Hereinafter, a welding method and a welding apparatus according to embodiments of the disclosure will be described in detail with reference to the attached drawings. Note that the embodiments described below do not limit the disclosure. In addition, note that the drawings are only illustrated in a schematic manner and, for example, dimensional relationship between elements or ratios of elements may differ from the actual dimensional relationship or ratios. In the drawings, there may be a portion in which the dimensional relationship or the ratio is different from that in a different drawing.

First Embodiment

FIG. 1 is a view illustrating a schematic configuration of a welding apparatus according to a first embodiment. As illustrated in FIG. 1, a welding apparatus 100 according to the first embodiment is an example of a configuration of an apparatus that irradiates a workpiece W with laser light L to melt the workpiece W. As illustrated in FIG. 1, the welding apparatus 100 includes a laser oscillator 110 that oscillates laser light, an optical head 120 that irradiates the workpiece W with laser light, and an optical fiber 130 that guides the laser light oscillated in the laser oscillator 110 to the optical head 120. The workpiece W includes at least two members to be welded.

The laser oscillator 110 is configured to be capable of oscillating multi-mode laser light, for example, having an output of several kWs. For example, the laser oscillator 110 may include a plurality of semiconductor laser elements, and may be configured to be capable of oscillating multi-mode laser light having an output of several kWs as a total output of the plurality of semiconductor laser elements. Alternatively, the laser oscillator 110 may include various lasers, such as a fiber laser, a YAG laser, and a disk laser.

The optical head 120 is an optical apparatus for concentrating the laser light L guided from the laser oscillator 110 to such a power density that is sufficient to melt the workpiece W, and for irradiating the workpiece W with the laser light L. For this purpose, the optical head 120 includes a collimating lens 121 and a focusing lens 122. The collimating lens 121 is an optical system for temporarily collimating the laser light guided by the optical fiber 130. The focusing lens 122 is an optical system for concentrating the collimated laser light to the workpiece W.

The optical head 120 is provided to be able to change a relative position thereof with respect to the workpiece W in order to move (sweep) a position of irradiation with the laser light L in the workpiece W. A method for changing the relative position with respect to the workpiece W includes moving the optical head 120 itself, moving the workpiece W, and the like. Namely, the optical head 120 may be configured to be able to cause the laser light L to sweep the workpiece W that is fixed; or with the position of irradiation with the laser light L from the optical head 120 being fixed, the workpiece W may be held to be movable with respect to the laser light L that is fixed. In the step of disposing the workpiece W in the region to be irradiated with the laser light L, at least two members to be welded are disposed to overlap with each other, or to be brought into contact with each other, or to be adjacent to each other.

Figure 15:
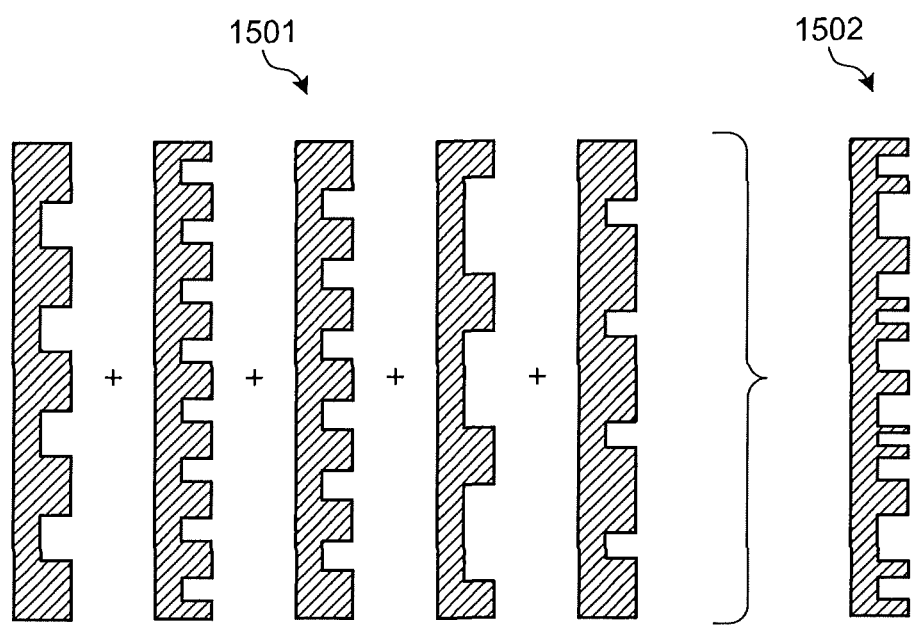
FIG. 15 is a view explaining a concept of a diffractive optical element.

The optical head 120 according to the first embodiment includes a diffractive optical element 123 disposed between the collimating lens 121 and the focusing lens 122 and serving as a beam shaper. The diffractive optical element referred here is an optical element 1502 into which a plurality of diffraction gratings 1501 having different periods are integrally formed, as illustrated according to a concept in FIG. 15. The laser light passing through this is bent in a direction of being influenced by each diffraction grating and overlaps, and the laser light having an arbitrary shape can be formed. In the present embodiment, the diffractive optical element 123 is used to form the laser light L such that a profile of power density of the laser light L in terms of a moving direction of the laser light L on the workpiece W represents a main beam and an auxiliary beam that has power density lower than power density of the main beam and that is disposed anterior, in the moving direction, to the main beam having higher power density. Note that the diffractive optical element 123 may be provided rotatably. In addition, this element may be provided replacably.

Here, the power density of the main beam or the auxiliary beam is power density in a region that includes a peak and has intensity equal to or more than $1/e^2$ of peak intensity. In addition, a beam diameter of the main beam or the auxiliary beam is a diameter of a region that includes a peak and has intensity equal to or more than $1/e^2$ of peak intensity. In the case of a non-circular beam, the beam diameter is defined herein as a length of a region that extends in a direction perpendicular to the moving direction and has intensity equal to or more than $1/e^2$ of peak intensity. The beam diameter of the auxiliary beam may be substantially equal to or larger than the beam diameter of the main beam.

Figure 2A:
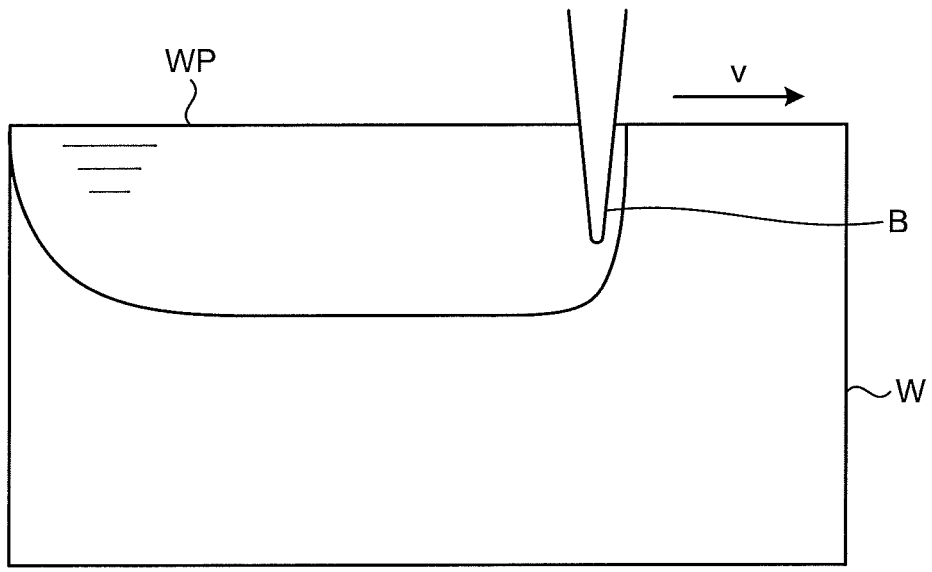
FIG. 2A is a view illustrating a comparative situation in which laser light melts a workpiece.
Figure 2B:
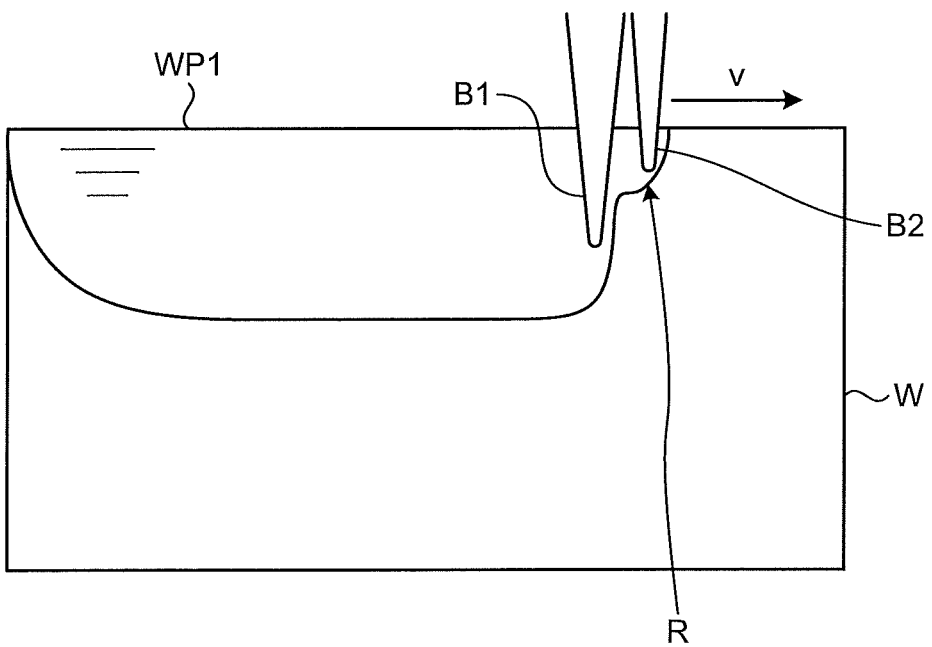
FIG. 2B is a view illustrating a comparative situation in which laser light melts a workpiece.

Next, description will be made on the profile of power density in terms of the moving direction of the laser light L on the workpiece W includes the auxiliary beam that has power density lower than power density of the main beam and that is disposed anterior, in the moving direction, to the main beam having higher power density. FIGS. 2A and 2B are views illustrating a comparative situation in which laser light melts a workpiece.

As illustrated in FIG. 2A, in a laser welding as a comparative example, since laser light includes one beam B, a molten pool WP in which the workpiece W melts is formed as a molten region extending in a direction opposite to the moving direction (arrow v) from a position irradiated with the laser light. On the other hand, as illustrated in FIG. 2B, in the welding apparatus according to the first embodiment and a welding method using this welding apparatus, the laser light irradiated on the workpiece W from the optical head 120 includes a main beam B1 and an auxiliary beam B2. Power density of the main beam B1 has, for example, intensity that enables at least a keyhole to be generated. Note that the keyhole will be described in detail below. Then, the auxiliary beam B2 having power density lower than the power density of the main beam B1 is provided anterior, in the moving direction (arrow v), to the main beam B1 having higher power density. In addition, the power density of the auxiliary beam B2 has intensity that enables the workpiece W to melt under presence of the main beam B1 or with the auxiliary beam B2 alone. Thus, a molten pool WP1 including a region shallower than a region molten by the main beam B1 is formed as a molten region anterior to a position to be irradiated with the main beam B1. This is referred to as a shallow region R for the purpose of convenience.

As illustrated in FIG. 2B, melt intensity regions of beams of laser light of the main beam B1 and the auxiliary beam B2 may overlap with each other, but do not necessarily overlap with each other as long as molten pools overlap with each other. Namely, it is only necessary that, before a molten pool formed with the auxiliary beam B2 solidifies, the melt intensity region formed with the main beam B1 can reach the molten pool formed with the auxiliary beam B2. As described above, the power density of the main beam B1 and the auxiliary beam B2 is intensity that enables the workpiece W to melt, and the melt intensity region refers to the range around the main beam B1 or the auxiliary beam B2 of a beam of laser light having power density that enables the workpiece W to melt.

In the welding apparatus according to the first embodiment and the welding method using this welding apparatus, the shallow region R exists anterior to the position to be irradiated with the main beam B1, and this stabilizes the molten pool WP1 in the vicinity of the position of irradiation with the main beam B1. While particles are generated as a result of scattering of molten metal, when the molten pool WP1 is stabilized in the vicinity of the position of irradiation with the main beam B1, generation of such particles (referred to as "sputter", for the sake of simplicity) is suppressed. An effect of this suppression of generation of sputter has also been confirmed in experiments described below.

A welding method according to the first embodiment includes steps of disposing the workpiece W in a region to be irradiated with the laser light L from the laser oscillator 110 serving as a laser element, relatively moving the laser light L and the workpiece W while irradiating the workpiece W with the laser light L from the laser oscillator 110, and melting and welding an irradiated portion of the workpiece W while causing the laser light L to sweep over the workpiece W. At this time, the laser light L includes the main beam B1 and the auxiliary beam B2, at least part of the auxiliary beam is disposed anteriorly in a sweep direction, and the main beam B1 has power density equal to or greater than power density of the auxiliary beam B2. The workpiece W corresponds to at least two members to be welded. The step of disposing the workpiece W in a region to be irradiated with the laser light L is a step of disposing the at least two members to overlap with each other, or to be brought into contact with each other, or to be adjacent to each other.

Note that the power density of the auxiliary beam B2 may be set such that the shallow region R is deeper than an acceptable diameter of porosity (welding defects such as a void shape, a pit shape in which a hole is opened from the inside to a surface, and a blow hole). Accordingly, impurities sticking on a surface of the workpiece W and serving as an example of cause of porosity flow into the shallow region R, and flow further into the molten pool WP1 formed with the main beam B1, and hence, the porosity is less likely to be generated. Note that the acceptable diameter of the porosity depends on, for example, intended usage of the workpiece W. Generally, the diameter of equal to or less than 200 µm is acceptable, and the diameter is preferably 100 µm, is more preferably equal to or less than 50 µm, even more preferably equal to or less than 30 µm, yet more preferably equal to or less than 20 µm, yet more preferably equal to or less than 10 µm, and most preferably no porosity is present.

Next, with reference to FIGS. 3A to 3F, description will be made on an example of a cross-sectional shape of laser light that includes the main beam and the auxiliary beam that has power density lower than power density of the main beam and that is disposed anterior, in the moving direction, to the main beam having higher power density. Although the example of the cross-sectional shape of the laser light illustrated in each of FIGS. 3A to 3F is not an essential configuration, a profile of laser light suitable for carrying out the welding method according to this embodiment can be achieved by designing the diffractive optical element 123 such that the cross-sectional shape of the laser light illustrated in each of FIGS. 3A to 3F is implemented on the surface of the workpiece W. Note that, all the cross-sectional shapes of the laser light are illustrated in FIGS. 3A to 3F as examples such that the laser light is to be moved in an upward direction (arrow v in the figures) on the pages of these figures.

Figure 3A:
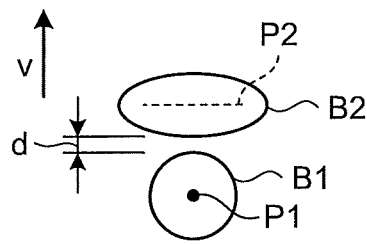
FIG. 3A is a view illustrating an example of a cross-sectional shape of laser light.

FIG. 3A illustrates an example in which one auxiliary beam B2 having a peak P2 and having power density lower than power density of the main beam B1 is provided anterior, in the moving direction, to the main beam B1 having a peak P1 and having higher power density. As illustrated in FIG. 3A, a region having power density that enables the workpiece in the vicinity of the auxiliary beam B2 to melt may have a width, in a direction perpendicular to the moving direction, wider than a region having power density that enables the workpiece in the vicinity of the main beam B1 to melt. Thus, as illustrated in FIG. 3A, the auxiliary beam B2 may be expanded continuously in the direction perpendicular to the moving direction, rather than have a dot shape.

Figure 3B:
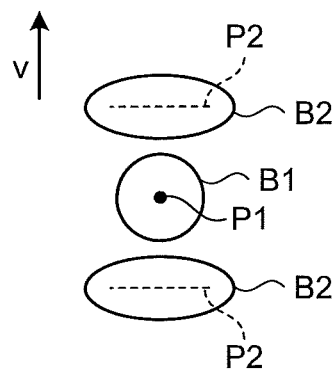
FIG. 3B is a view illustrating an example of a cross-sectional shape of laser light.

FIG. 3B illustrates an example in which the auxiliary beam B2 having power density lower than power density of the main beam B1 is also provided posterior, in the moving direction, to the main beam B1, in addition to the auxiliary beam B2 that has power density lower than power density of the main beam B1 and that is disposed anterior, in the moving direction, to the main beam B1 having higher power density. Welding processing may be performed not only in a forward direction but also in a backward direction. Thus, as in the example illustrated in FIG. 3B, when the auxiliary beam B2 having power density lower than power density of the main beam B1 is also provided posterior, in the moving direction, to the main beam B1, it is possible to obtain the effect of the welding method according to this embodiment without changing a direction of the optical head.

Figure 3C:
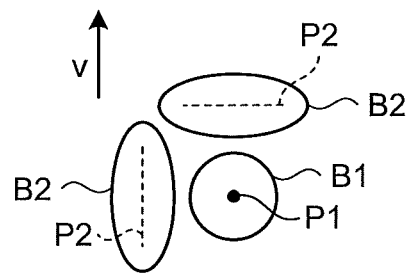
FIG. 3C is a view illustrating an example of a cross-sectional shape of laser light.

FIG. 3C illustrates an example in which the auxiliary beam B2 having power density lower than power density of the main beam B1 is also provided sideward in the moving direction of the main beam B1, in addition to the auxiliary beam B2 having power density lower than power density of the main beam B1 and being disposed anterior, in the moving direction, to the main beam B1 having higher power density. Welding processing is not necessarily performed along a straight line. Thus, as in the example illustrated in FIG. 3C, when the auxiliary beam B2 having power density lower than power density of the main beam B1 is also provided sideward in the moving direction of the main beam B1, it is possible to obtain the effect of the welding method according to this embodiment at the time of welding of a corner portion or the like.

Figure 3D:
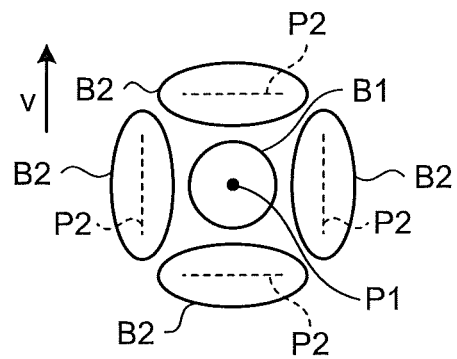
FIG. 3D is a view illustrating an example of a cross-sectional shape of laser light.

FIG. 3D illustrates an example in which the auxiliary beam B2 having power density lower than power density of the main beam B1 is also provided posterior, in the moving direction, to the main beam B1, in addition to the auxiliary beam B2 that has power density lower than power density of the main beam B1 and that is provided posterior, in the moving direction, to the main beam B1 having higher power density. That is, the example illustrated in FIG. 3D has both the advantage obtained from the example illustrated in FIG. 3B and the advantage obtained from the example illustrated in FIG. 3C.

Figure 3E:
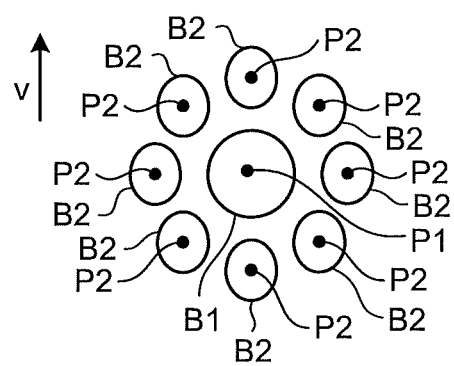
FIG. 3E is a view illustrating an example of a cross-sectional shape of laser light.
Figure 3F:
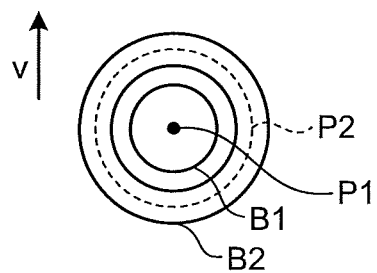
FIG. 3F is a view illustrating an example of a cross-sectional shape of laser light.

FIG. 3E illustrates an example in which the auxiliary beams B2 having power density lower than power density of the main beam B1 are provided in a dispersed manner around the main beam B1. Although in the examples illustrated in FIGS. 3A to 3D the auxiliary beams B2 are linearly configured, it is not necessary to continuously provide the auxiliary beams B2, provided that the auxiliary beams B2 are disposed at a short interval to some degree. This is because, when the auxiliary beams B2 are disposed at a short interval to some degree, the shallow regions R are connected to each other, and hence, it is possible to obtain an achievable effect. FIG. 3F illustrates an example in which the auxiliary beam B2 having power density lower than power density of the main beam B1 is provided in a ring shape around the main beam B1. Contrary to FIG. 3E, the auxiliary beam B2 can also be provided to continuously encompass the main beam B1.

Note that a distance d (for example, illustrated in FIG. 3A) between the main beam B1 and the auxiliary beam B2 is the shortest distance between an outer edge of the main beam B1 and an outer edge of the auxiliary beam B2. Although it is sufficient that, before a molten pool formed with the auxiliary beam B2 solidifies, a molten region formed with the main beam B1 can reach this molten pool, the distance d may be less than two times the beam diameter of the auxiliary beam B2, less than one time, or less than 0.5 times.

In addition, the power density of the main beam B1 and the power density of the auxiliary beam B2 may be equal to each other.

Second Embodiment

Figure 4:
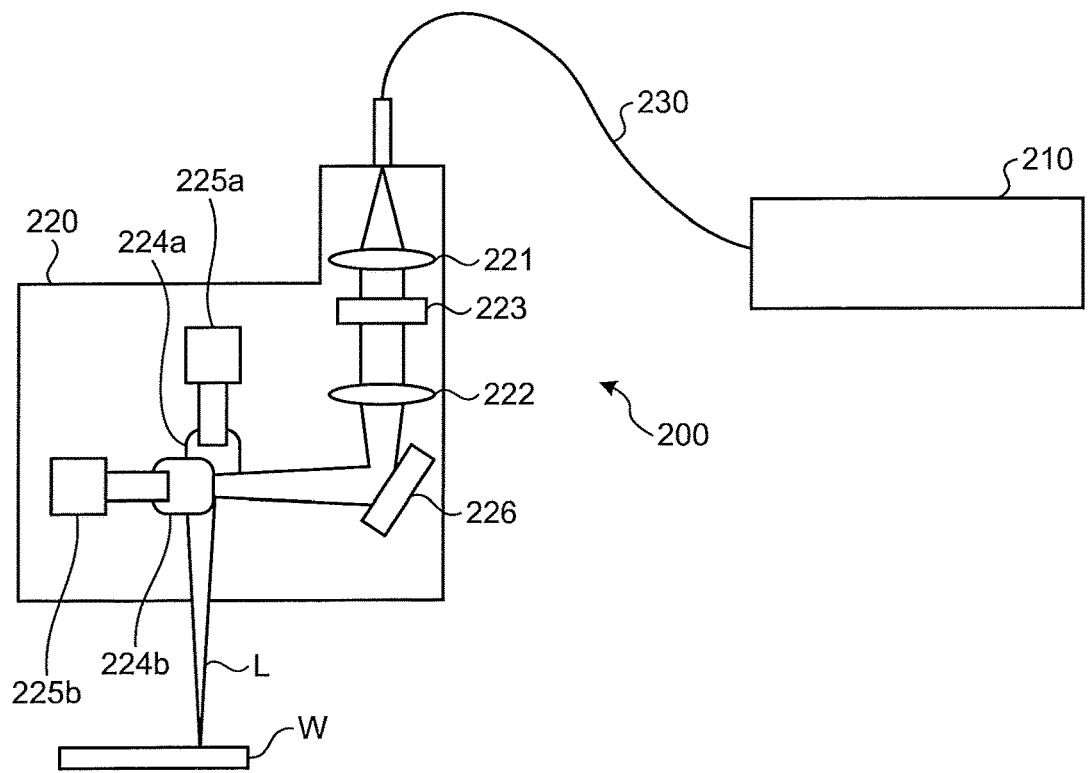
FIG. 4 is a view illustrating a schematic configuration of a welding apparatus according to a second embodiment.

FIG. 4 is a view illustrating a schematic configuration of a welding apparatus according to a second embodiment. As illustrated in FIG. 4, a welding apparatus 200 according to the second embodiment is an example of a configuration of an apparatus that irradiates a workpiece W with laser light L to melt the workpiece W. The welding apparatus 200 according to the second embodiment is used to achieve a welding method using a principle of action similar to that of the welding apparatus according to the first embodiment. Thus, only an apparatus configuration of the welding apparatus 200 will be described below.

As illustrated in FIG. 4, the welding apparatus 200 includes a laser oscillator 210 that oscillates laser light, an optical head 220 that irradiates the workpiece W with the laser light, and an optical fiber 230 that guides the laser light oscillated in the laser oscillator 210 to the optical head 220.

The laser oscillator 210 is configured to be capable of oscillating multi-mode laser light, for example, having an output of several kWs. For example, the laser oscillator 210 may include a plurality of semiconductor laser elements, and may be configured to be capable of oscillating multi-mode laser light having an output of several kWs as a total output of the plurality of semiconductor laser elements, or various lasers, such as a fiber laser, a YAG laser, and a disk laser, may be used.

The optical head 220 is an optical apparatus for concentrating laser light L guided from the laser oscillator 210 to such a power density that is sufficient to melt the workpiece W, and for irradiating the workpiece W with the laser light L. For this purpose, the optical head 220 includes a collimating lens 221 and a focusing lens 222. The collimating lens 221 is an optical system for temporarily collimating the laser light guided by the optical fiber 230. The focusing lens 222 is an optical system for concentrating the collimated laser light to the workpiece W.

The optical head 220 includes a galvano scanner between the focusing lens 222 and the workpiece W. The galvano scanner is an apparatus capable of controlling angles of two mirrors 224a and 224b to move the position of irradiation with the laser light L without moving the optical head 220. In the example illustrated in FIG. 4, a mirror 226 for guiding the laser light L emitted from the focusing lens 222 to the galvano scanner is provided. In addition, the angles of the mirrors 224a and 224b of the galvano scanner are changed by using a motor 225a and 225b, respectively.

The optical head 220 according to the second embodiment includes a diffractive optical element 223 between the collimating lens 221 and the focusing lens 222. The diffractive optical element 223 is used to form the laser light L such that a profile of power density of the laser light L in terms of the moving direction of the laser light L on the workpiece W represents a main beam and an auxiliary beam that has power density lower than power density of the main beam and that is disposed anterior, in the moving direction, to the main beam having higher power density. The action of the diffractive optical element 223 is similar to that in the first embodiment. That is, the diffractive optical element 223 is designed to achieve a profile of laser light suitable for carrying out the welding method of this embodiment, such as the cross-sectional shapes of the laser light illustrated as examples in FIGS. 3A to F.

Third Embodiment

Figure 5:
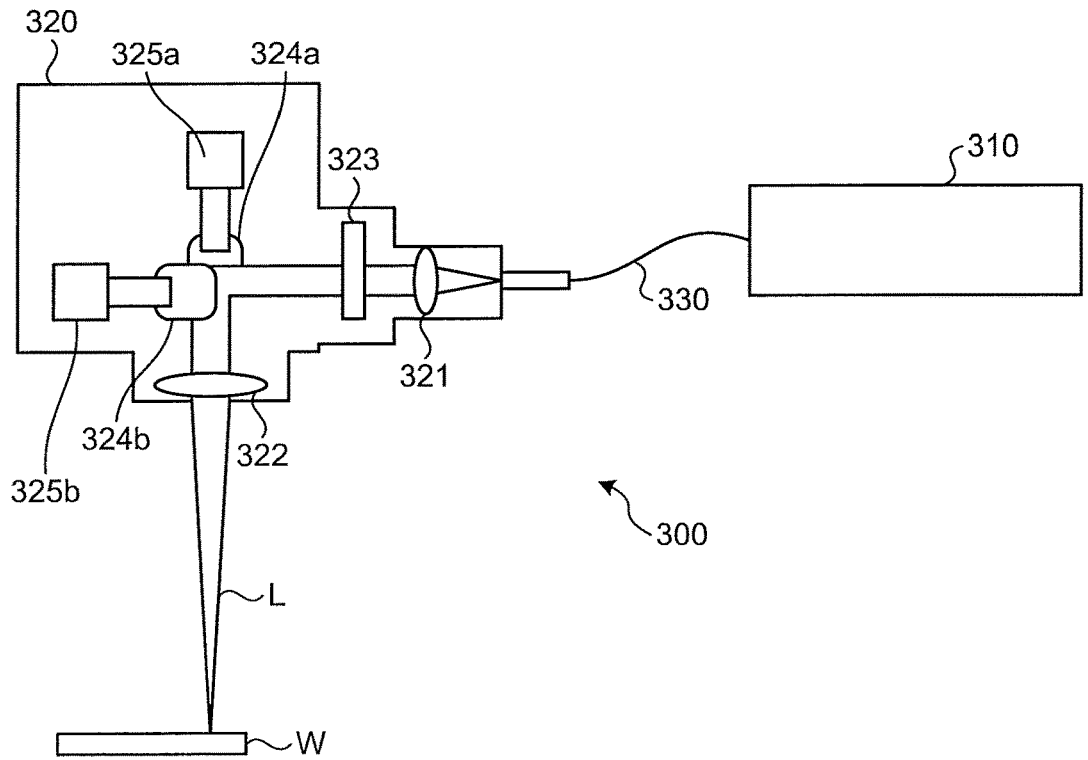
FIG. 5 is a view illustrating a schematic configuration of a welding apparatus according to a third embodiment.

FIG. 5 is a view illustrating a schematic configuration of a welding apparatus according to a third embodiment. As illustrated in FIG. 5, a welding apparatus 300 according to the third embodiment is an example of a configuration of an apparatus that irradiates a workpiece W with laser light L to melt the workpiece W. The welding apparatus 300 according to the third embodiment uses an action principle similar to that of the welding apparatus according to the first embodiment to achieve a welding method, and a configuration (a laser oscillator 310 and an optical fiber 330) other than an optical head 320 is similar to that of the second embodiment. Thus, only an apparatus configuration of the optical head 320 will be described below.

The optical head 320 is an optical apparatus for concentrating the laser light L guided from the laser oscillator 310 to such a power density that is sufficient to melt the workpiece W, and for irradiating the workpiece W with the laser light L. For this purpose, the optical head 320 includes a collimating lens 321 and a focusing lens 322. The collimating lens 321 is an optical system for temporarily collimating the laser light guided by the optical fiber 330. The focusing lens 322 is an optical system for concentrating the collimated laser light to the workpiece W.

The optical head 320 includes a galvano scanner between the collimating lens 321 and the focusing lens 322. Angles of mirrors 324a and 324b of the galvano scanner are changed by using motors 325a and 325b, respectively. In the optical head 320, the galvano scanner is provided at a position different from that in the second embodiment. However, similarly, the angles of the two mirrors 324a and 324b are controlled, and thus it is possible to move a position of irradiation with the laser light L without moving the optical head 320.

The optical head 320 according to the third embodiment includes a diffractive optical element 323 between the collimating lens 321 and the focusing lens 322. The diffractive optical element 323 is used to form the laser light L such that a profile of power density of the laser light L in terms of the moving direction of the laser light L on the workpiece W represents a main beam and an auxiliary beam that has power density lower than power density of the main beam and that is disposed anterior, in the moving direction, to the main beam having higher power density. The action of the diffractive optical element 323 is similar to that in the first embodiment. That is, the diffractive optical element 323 is designed to achieve a profile of laser light suitable for carrying out the welding method of this embodiment, such as the cross-sectional shapes of the laser light illustrated as examples in FIG. 3.

Fourth Embodiment

Figure 6:
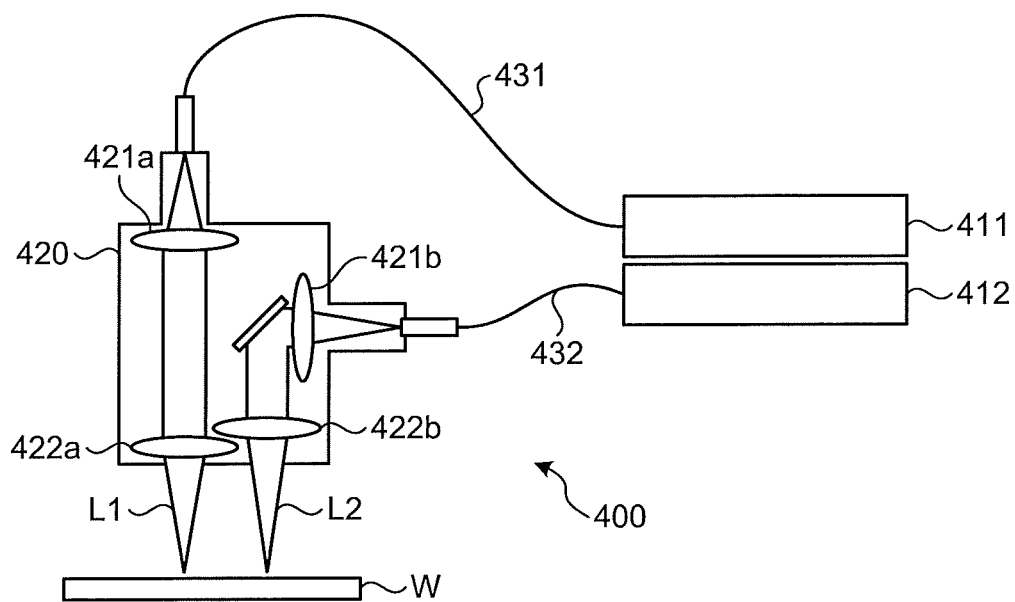
FIG. 6 is a view illustrating a schematic configuration of a welding apparatus according to a fourth embodiment.

FIG. 6 is a view illustrating a schematic configuration of a welding apparatus according to a fourth embodiment. As illustrated in FIG. 6, a welding apparatus 400 according to the fourth embodiment is an example of a configuration of an apparatus that irradiates a workpiece W with laser light L1 and L2 to melt the workpiece W. The welding apparatus 400 according to the fourth embodiment uses an action principle similar to that of the welding apparatus according to the first embodiment to achieve a welding method. Thus, only an apparatus configuration of the welding apparatus 400 will be described below.

As illustrated in FIG. 6, the welding apparatus 400 includes a plurality of laser oscillators 411 and 412 that oscillate laser light, an optical head 420 that irradiates the workpiece W with laser light, and optical fibers 431 and 432 that guide the laser light oscillated in the laser oscillators 411 and 412 to the optical head 420.

The laser oscillators 411 and 412 are each configured to be capable of oscillating multi-mode laser light, for example, having an output of several kWs. For example, the laser oscillators 411 and 412 may each include a plurality of semiconductor laser elements, and may be configured to be capable of oscillating multi-mode laser light having an output of several kWs as a total output of the plurality of semiconductor laser elements, or various lasers, such as a fiber laser, a YAG laser, and a disk laser, may be used.

The optical head 420 is an optical apparatus for concentrating laser light L1 and L2 guided from the laser oscillators 411 and 412, respectively, to such a power density that is sufficient to melt the workpiece W, and for irradiating the workpiece W with the laser light L1 and L2. For this purpose, the optical head 420 includes a collimating lens 421a and a focusing lens 422a for the laser light L1, and includes a collimating lens 421b and a focusing lens 422b for the laser light L2. Each of the collimating lenses 421a and 421b is an optical system for temporarily collimating the laser light guided by the optical fibers 431 and 432. Each of the focusing lenses 422a and 422b is an optical system for concentrating the collimated laser light to the workpiece W.

The optical head 420 according to the fourth embodiment is also configured such that a profile of power density of the laser light L1 and L2 in terms of the moving direction of the laser light L1 and L2 on the workpiece W represents a main beam and an auxiliary beam that has power density lower than power density of the main beam and that is disposed anterior, in the moving direction, to the main beam having higher power density. That is, it is only necessary that, of the laser light L1 and L2 with which the optical head 420 irradiates the workpiece W, the laser light L1 is used to form the main beam, and the laser light L2 is used to form the auxiliary beam. Note that although only beams of the laser light L1 and L2 are used in the example illustrated in the figure, it is possible to increase the number of beams of the laser light as appropriate to employ a configuration that achieves a profile of laser light suitable for carrying out the welding method of this embodiment, such as the cross-sectional shapes of laser light illustrated as examples in FIG. 3.

Fifth Embodiment

Figure 7:
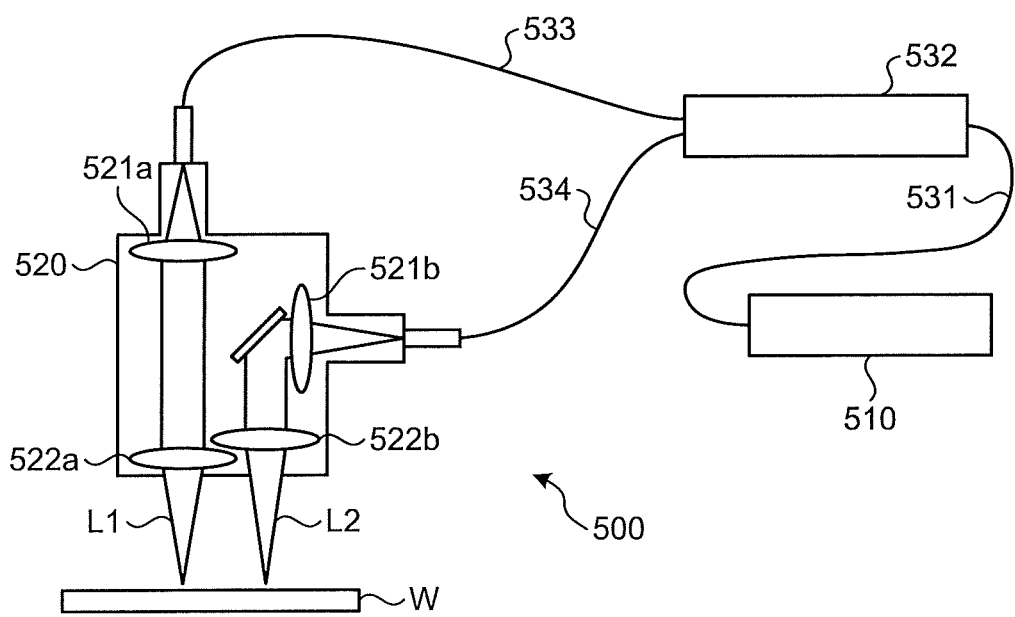
FIG. 7 is a view illustrating a schematic configuration of a welding apparatus according to a fifth embodiment.

FIG. 7 is a view illustrating a schematic configuration of a welding apparatus according to a fifth embodiment. As illustrated in FIG. 7, a welding apparatus 500 according to the fifth embodiment is an example of a configuration of an apparatus that irradiate a workpiece W with laser light L1 and L2 to melt the workpiece W. The welding apparatus 500 according to the fifth embodiment uses an action principle similar to that of the welding apparatus according to the first embodiment to achieve a welding method. Thus, only an apparatus configuration of the welding apparatus 500 will be described below.

As illustrated in FIG. 7, the welding apparatus 500 includes a laser oscillator 510 that oscillates laser light, an optical head 520 that irradiate the workpiece W with the laser light, and optical fibers 531, 533, and 534, each of which guides the laser light oscillated in the laser oscillator 510 to the optical head 520.

In the fifth embodiment, the laser oscillator 510 is used to oscillate both the laser light L1 and L2, with which the workpiece W is irradiated, as represented by a fiber laser, a YAG laser, a disk laser, or the like. For this purpose, a branching unit 532 is provided between the optical fibers 531, 533, and 534 that guide the laser light oscillated in the laser oscillator 510 to the optical head 520, and is configured to branch the laser light oscillated in the laser oscillator 510 to be guided to the optical head 520.

The optical head 520 is an optical apparatus for concentrating the laser light L1 and L2 branched at the branching unit 532 to such a power density that is sufficient to melt the workpiece W, and for irradiating the workpiece W with the laser light L1 and L2. For this purpose, the optical head 520 includes a collimating lens 521a and a focusing lens 522a for the laser light L1, and includes a collimating lens 521b and a focusing lens 522b for the laser light L2. Each of the collimating lenses 521a and 521b is an optical system for temporarily collimating the laser light guided by the optical fibers 533 and 534. Each of the focusing lenses 522a and 522b is an optical system for concentrating the collimated laser light to the workpiece W.

The optical head 520 according to the fifth embodiment is also configured such that a profile of power density of the laser light L1 and L2 in terms of the moving direction of the laser light L1 and L2 on the workpiece W represents a main beam and an auxiliary beam that has power density lower than power density of the main beam and that is disposed anterior, in the moving direction, to the main beam having higher power density. That is, it is only necessary that, of the laser light L1 and L2 with which the optical head 520 irradiates the workpiece W, the laser light L1 is used to form the main beam, and the laser light L2 is used to form the auxiliary beam. Note that, although only the laser light L1 and L2 are used in the example illustrated in the figure, it is possible to increase the number of beams of the laser light as appropriate to employ a configuration that achieves a profile of laser light suitable for carrying out the welding method of this embodiment, such as the cross-sectional shapes of laser light illustrated as examples in FIG. 3.

Sixth Embodiment

Figure 8:
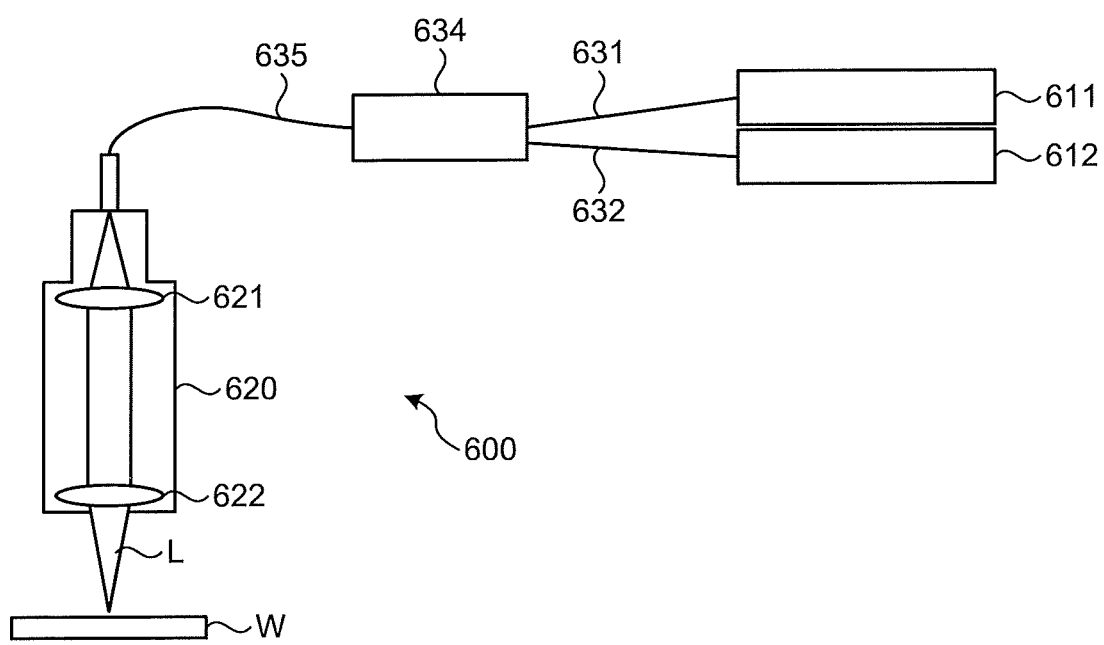
FIG. 8 is a view illustrating a schematic configuration of a welding apparatus according to a sixth embodiment.

FIG. 8 is a view illustrating a schematic configuration of a welding apparatus according to a sixth embodiment. As illustrated in FIG. 8, a welding apparatus 600 according to the sixth embodiment is an example of a configuration of an apparatus that irradiates a workpiece W with laser light L to melt the workpiece W. The welding apparatus 600 according to the sixth embodiment uses an action principle similar to that of the welding apparatus according to the first embodiment to achieve a welding method. Thus, only an apparatus configuration of the welding apparatus 600 will be described below.

As illustrated in FIG. 8, the welding apparatus 600 includes a plurality of laser oscillators 611 and 612, each pf which oscillates laser light such as a fiber laser, a YAG laser, and a disk laser, an optical head 620 that irradiates the workpiece W with laser light, and optical fibers 631, 632, and 635 that guide the laser light oscillated in the laser oscillators 611 and 612 to the optical head 620.

In the sixth embodiment, the laser light oscillated in the laser oscillators 611 and 612 is combined before being guided to the optical head 620. For this purpose, a combining portion 634 is provided between the optical fibers 631, 632, and 635, each of which guides the laser light oscillated in the laser oscillators 611 and 612 to the optical head 620, and the laser light oscillated in the laser oscillators 611 and 612 is guided in parallel in the optical fiber 635.

Figure 9A:
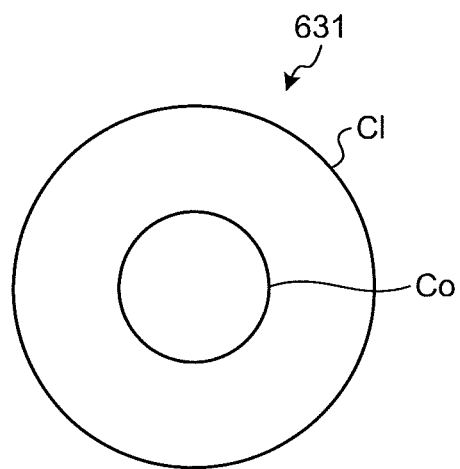
FIG. 9A is a view illustrating a configuration example of an optical fiber.
Figure 9B:
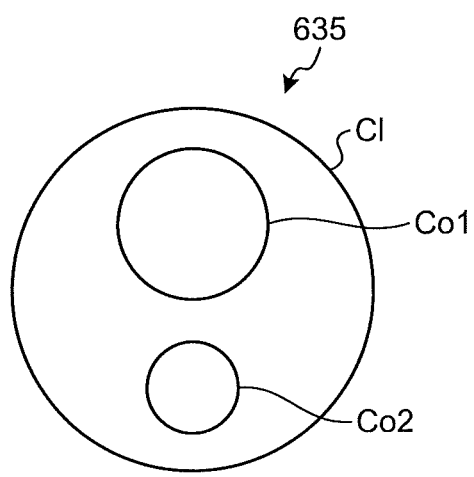
FIG. 9B is a view illustrating a configuration example of an optical fiber.

Here, examples of configurations of the optical fiber 631 (and 632) and the optical fiber 635 will be described with reference to FIGS. 9A and 9B. As illustrated in FIG. 9A, the optical fiber 631 (and 632) is a general optical fiber. Namely, the optical fiber 631 (and 632) is an optical fiber in which cladding C1 having a refractive index lower than a refractive index of a core Co is formed around the core Co. On the other hand, as illustrated in FIG. 9B, the optical fiber 635 is a so-called multi core optical fiber. Namely, the optical fiber 635 includes two cores Co1 and Co2, and the cladding C1 having a refractive index lower than a refractive index of each of the cores Co1 and Co2 is formed around the two cores Co1 and Co2. Then, in the combining portion 634, the core Co of the optical fiber 631 and the core Co1 of the optical fiber 635 are combined, and the core Co of the optical fiber 632 and the core Co2 of the optical fiber 635 are combined.

Explanation returns to FIG. 8. The optical head 620 is an optical apparatus for concentrating the laser light L combined by the combining portion 634 to such a power density that is sufficient to melt the workpiece W, and for irradiating the workpiece W with the laser light L. For this purpose, the optical head 620 includes a collimating lens 621 and a focusing lens 622.

In the present embodiment, the optical head 620 includes no diffractive optical element and includes no independent optical system for a plurality of beams of laser light. However, the laser light oscillated in the laser oscillators 611 and 612 is combined before being guided to the optical head 620, and hence, a profile power density of the laser light L in terms of the moving direction of the laser light L on the workpiece W is configured to represent a main beam and an auxiliary beam that has power density lower than power density of the main beam and that is disposed anterior, in the moving direction, to the main beam having higher power density.

Note that in all the embodiments described herein, a welded form with the main beam may be of keyhole welding or may be of heat conductive welding. Here, the keyhole welding refers to a welding method using high power density and using a well or a hole (keyhole) generated by pressure of metal vapor generated when the workpiece W melts. On the other hand, the heat conductive welding refers to a welding method in which heat generated through absorption of laser light on a surface of a base material is used to melt the workpiece W.

First Verification Experiment

Here, the results of a first verification experiment concerning the effect of the disclosure will be described. An apparatus configuration used in this first verification experiment is the configuration of the welding apparatus 100 according to the first embodiment, and an apparatus configuration used in an example in the related art is a configuration in which the diffractive optical element 123 is omitted from the welding apparatus 100. Note that as conditions to be shared among experiments, an output of the laser oscillator 110 is set to 3 kW, a relative moving speed between the optical head 120 and the workpiece W is set to 5 m per minute, and nitrogen gas is used as a shielding gas.

Figure 10:
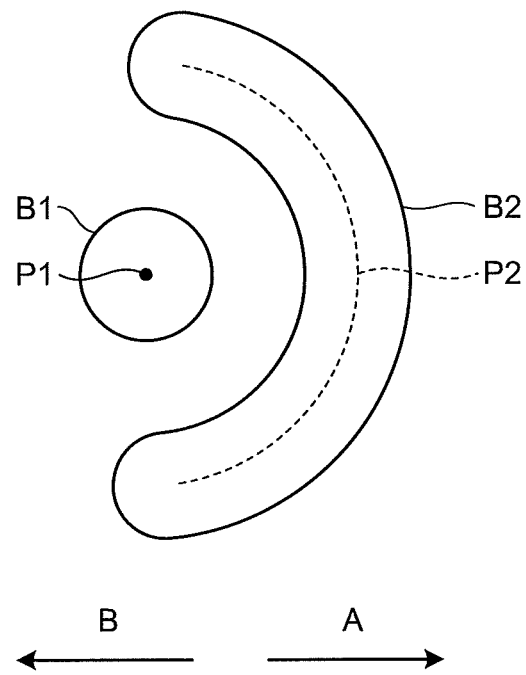
FIG. 10 is a view illustrating a cross-sectional shape of laser light used in an experiment.

The diffractive optical element 123 is designed such that the workpiece W is irradiated with laser light as illustrated in FIG. 10 formed with a main beam B1 having a peak P1 and an auxiliary beam B2 having a peak P2, and having a cross-sectional shape in which the auxiliary beam B2 has an arc shape that is a portion of a ring shape surrounding the main beam B1. Generation of sputter was observed in two directions of a direction in which the laser light formed by the diffractive optical element 123 is moved in an arrow A in the figure and a direction in which the laser light formed by the diffractive optical element 123 is moved in an arrow B in the figure. Note that in the apparatus configuration in the example in the related art, the workpiece W is irradiated with laser light shaped such that an arc portion is taken out from a cross-sectional shape of the laser light illustrated in FIG. 10.

Namely, in this first verification experiment, the case of moving in the direction of the arrow A in the figure corresponds to a situation where the auxiliary beam B2 having power density lower than power density of the main beam B1 is provided anterior, in the moving direction, to the main beam B1 having higher power density, and the case of moving in the direction of the arrow B in the figure corresponds to a situation where the auxiliary beam B2 having power density lower than power density of the main beam B1 is provided posterior, in the moving direction, to the main beam B1 having higher power density, and the case of the configuration of the example in the related art corresponds to a situation where irradiation with only the main beam B1 is performed.

More sputter is generated in the situations where irradiation with only the main beam B1 is performed and the situation where the auxiliary beam B2 having power density lower than power density of the main beam B1 is provided posterior, in the moving direction, to the main beam B1 having higher power density. On the other hand, the sputter is generated significantly less in the situation where the auxiliary beam B2 having power density lower than power density of the main beam B1 is provided anterior, in the moving direction, to the main beam B1 having higher power density, and an amount of the sputter generated is equal to or less than approximately 20%.

This first verification experiment also confirms that an effect of suppressing generation of sputter can be obtained from the welding apparatus in which the profile of power density of the laser light L in terms of the moving direction of the laser light L on the workpiece W represents a main beam and an auxiliary peak that has power density lower than power density of the main peak and that is disposed anterior, in the moving direction, to the main peak having higher power density, and can be obtained from the welding method using the welding apparatus.

In addition, even under the conditions where nitrogen gas is not used, the effect was confirmed as shown in Table 1. Table 1 shows four experiments. A material of a workpiece is SUS 304 having a thickness of 10 mm. DOE is a diffractive optical element. A focal position is a focal position of the main beam and a focal position of the auxiliary beam, and focus is placed on a surface. A setting output is power of laser light output from the laser oscillator. Speed is a sweep rate. As to appearance, experiments No. 3 and No. 4 exhibited favorable results.

TABLE 1

| Experiment No. | Material | | Focal position [mm] | Setting output [W] | Speed | | Appearance |
|---|---|---|---|---|---|---|---|
| | Material | DOE | | | mm/s | m/min | |
| 1 | SUS304 10 mm | none | Surface JF | 3000 | 83.3 | 5.0 | Many sputters |
| 2 | SUS304 10 mm | DOE exists (There is no auxiliary beam in front of main beam) | Surface JF | 3000 | 83.3 | 5.0 | Sputter exists only in front |
| 3 | SUS304 10 mm | DOE exists (There is the auxiliary beam in front of the main beam) | Surface JF | 3000 | 83.3 | 5.0 | A few sputters |
| 4 | SUS304 10 mm | DOE exists (There is the auxiliary beam in front of the main beam) | Surface JF | 3000 | 166.6 | 10.0 | " |

Figure 11:
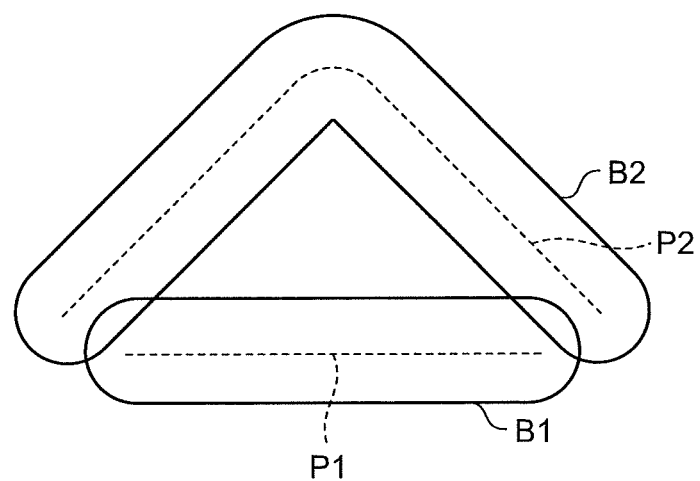
FIG. 11 is a view illustrating an example of a cross-sectional shape of laser light.
Figure 12:
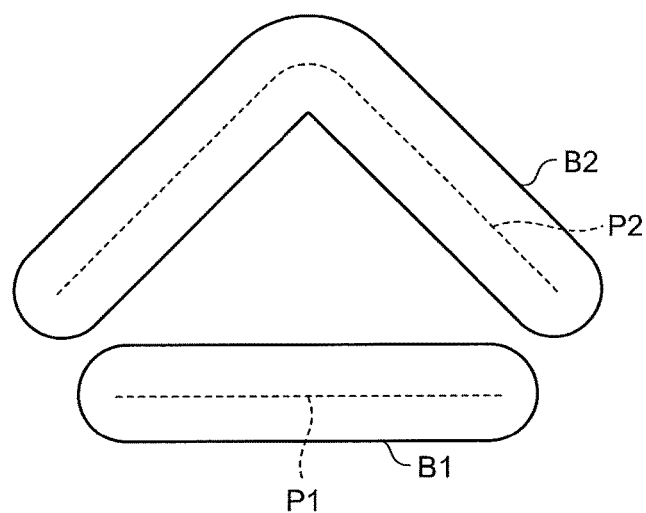
FIG. 12 is a view illustrating an example of a cross-sectional shape of laser light.

FIGS. 11 and 12 are views each illustrating an example of a cross-sectional shape of laser light, and illustrates an example in which a v-shaped auxiliary beam B2 having power density lower than power density of the main beam B1 is provided anterior, in the moving direction, to the main beam B1 having higher power density. FIG. 11 illustrates an example where the main beam B1 and the auxiliary beam B2 overlap, and FIG. 12 illustrates an example in which the main beam B1 and the auxiliary beam B2 do not overlap.
(Reflectivity of Metal Material)

Here, a reflectivity of a metal material will be described. A graph shown in FIG. 13 indicates a reflectivity of a typical metal material in relation to a wavelength of light. In the graph shown in FIG. 13, a horizontal axis indicates the wavelength and the vertical axis indicates the reflectivity. As examples of the metal material, aluminum, copper, gold, nickel, platinum, silver, stainless steel, titanium, and tin are described. Note that the graph shown in FIG. 13 is obtained according to data described in NASA TECHNICAL NOTE (D-5353).

Figure 13:
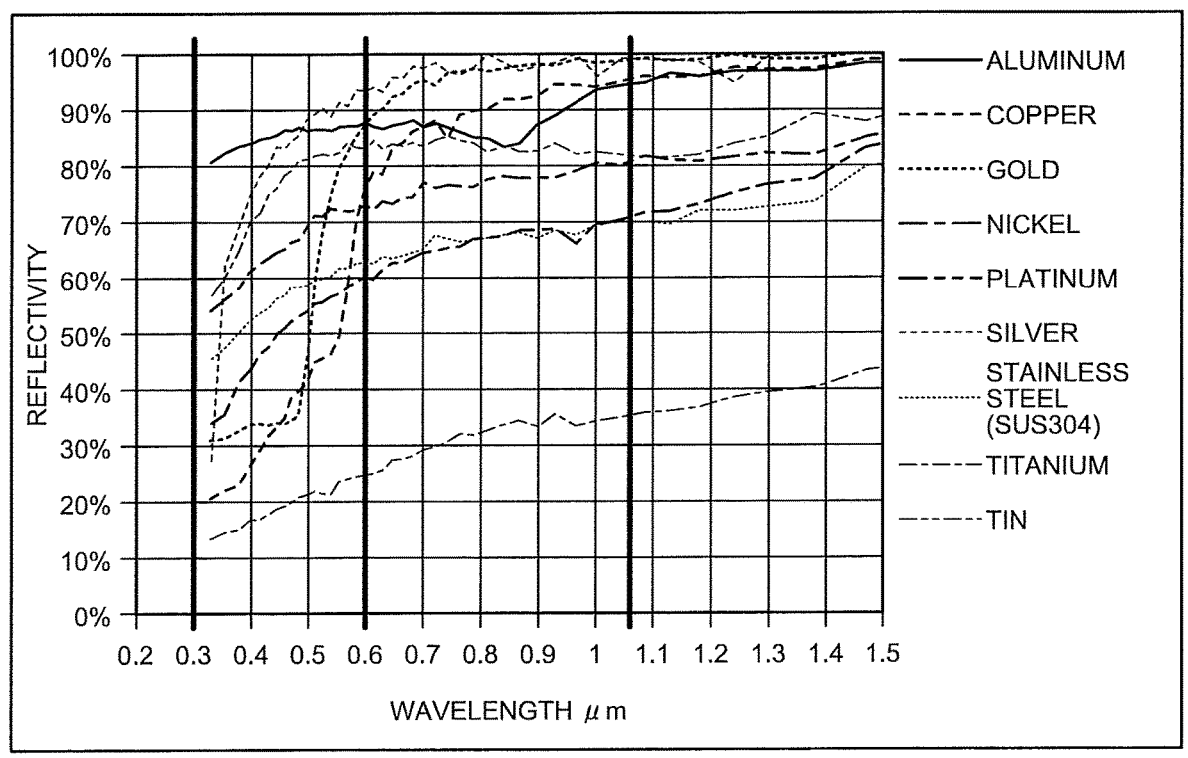
FIG. 13 is a graph showing reflectivity of typical metal materials in association with a wavelength of light.

As can be understood from the graph shown in FIG. 13, copper, aluminum, and the like have higher reflectivities than reflectivities of stainless steel and the like. In particular, a difference in the reflectivity is significant in a wavelength region of infrared laser light commonly used in laser welding. For example, since the reflectivity of copper or aluminum is approximately 95% at or near 1070 nm, only approximately 5% of energy of irradiation laser light is absorbed by a workpiece. This means that efficiency of irradiation energy is approximately one-sixth of that of stainless steel.

On the other hand, although copper, aluminum, or the like exhibits high reflectivity, their high reflectivity is exhibited with respect not all of the wavelengths of light. In particular, a variation in reflectivity of copper is significant. The reflectivity of copper is approximately 95% at or near 1070 nm as described above. However, the reflectivity of copper is approximately 75% at the wavelength of yellow (for example, 600 nm). Then, the reflectivity suddenly drops, and the reflectivity of copper is approximately 20% at the wavelength of ultraviolet light (for example, 300 nm). Thus, the efficiency of energy of laser welding using blue or green laser light is higher than efficiency of energy of laser welding using typical infrared laser light. Specifically, it is preferable to use laser light having a wavelength from 300 nm to 600 nm.

Note that the range of the wavelength described above is an example, and when laser welding is performed by using laser light having a wavelength at which a reflectivity is lower than a reflectivity in an infrared region of a target material, it is possible to perform welding with high energy efficiency in terms of reflectivity. It is preferable that the infrared region in this case be 1070 nm that is a wavelength of infrared laser light used for typical laser welding.

A welding method and a welding apparatus according to the embodiment of the disclosure described below make the most of the characteristics described above.

Seventh Embodiment

A welding apparatus according to a seventh embodiment can be achieved by using the welding apparatus 100 according to the first embodiment illustrated in FIG. 1.

A laser oscillator 110 is configured to be capable of oscillating multi-mode laser light, for example, having an output of several kWs. For example, the laser oscillator 110 may include a plurality of semiconductor laser elements and may be configured to be capable of oscillating multi-mode laser light, for example, having an output of several kWs as a total output of the plurality of semiconductor laser elements. From the viewpoint described above, in the seventh embodiment, it is preferable that the laser oscillator 110 be configured to oscillate laser light having a wavelength in the range of 300 nm to 600 nm. Further, it is more preferable to select, depending on a workpiece W, the laser oscillator 110 that oscillates a wavelength at which a reflectivity of the workpiece W is low.

An optical head 120 according to the seventh embodiment includes a diffractive optical element 123 disposed between a collimating lens 121 and a focusing lens 122 and serving as a beam shaper. The diffractive optical element 123 is used to form laser light L such that a profile of power density of the laser light L in terms of the sweep direction of the laser light L on the workpiece W represents a main beam and an auxiliary beam located anterior, in the sweep direction, to the main beam. Thus, the welding apparatus 100 according to the seventh embodiment is configured such that laser light emitted from one laser oscillator 110 is separated by the diffraction optical element 123. As a result, the wavelengths of the laser light forming both the main beam and the auxiliary beam are the same. Note that the diffractive optical element 123 can be provided rotatably. In addition, the diffractive optical element 123 can be provided to be replaceable.

Figure 14A:
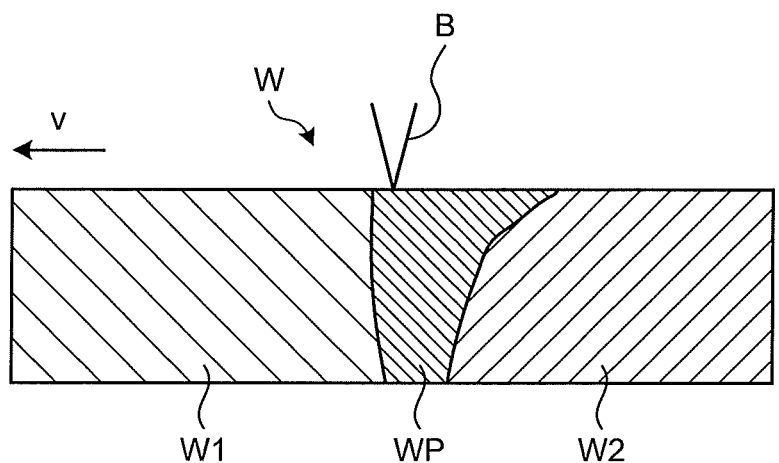
FIG. 14A is a view illustrating a comparative situation in which laser light melts a workpiece.
Figure 14B:
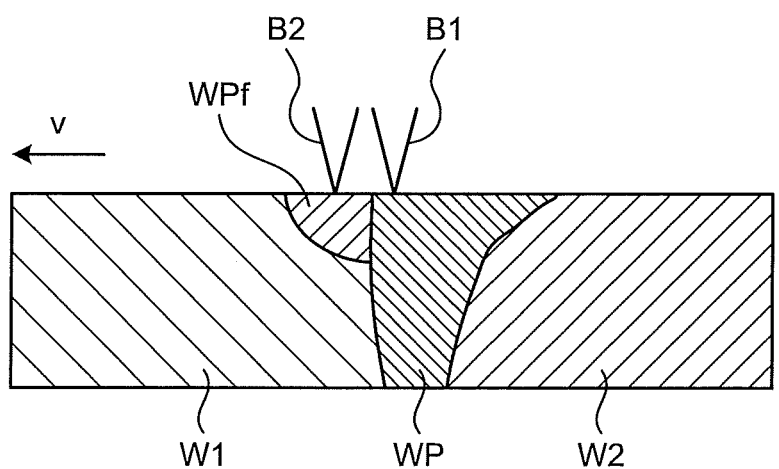
FIG. 14B is a view illustrating of a comparative situation in which laser light melts a workpiece.

The action in which the profile in terms of the sweep direction of power density of the laser light L on the workpiece W includes an auxiliary beam located anterior, in the sweep direction, to the main beam is as follows. FIGS. 14A and 14B are views illustrating a comparative situation in which laser light melts a workpiece.

As illustrated in FIG. 14A, in the laser welding in the related art, laser light includes one beam B. Thus, a before-melting metal W1 disposed anterior, in the sweep direction (arrow v), to a position to be irradiated with the laser light melts by energy of the laser light, and a molten pool WP in which the workpiece W melts is formed toward a direction opposite to the sweep direction (arrow v) from a position irradiated with the laser light. Subsequently, the molten pool WP solidifies again to be a re-solidifying metal W2, and the workpiece W is welded.

On the other hand, as illustrated in FIG. 14B, in the welding apparatus according to the eleventh embodiment and the welding method using the welding apparatus, a profile of power density of the laser light in terms of the sweep direction of the laser light on the workpiece W represents the main beam B1 and the auxiliary beam B2. Then, the auxiliary beam B2 having power density lower than power density of the main beam B1 is provided anterior, in the sweep direction (arrow v), to the main beam B1 having higher power density. In addition, the power density of the auxiliary beam B2 has intensity that enables the workpiece W to melt under the presence of the main beam B1 or with the auxiliary beam B2 alone. Thus, a molten pool having a depth shallower than a depth at which the main beam B1 melts is formed anterior to the position to be irradiated with the main beam B1. This is called an anterior molten pool WPf for the purpose of convenience.

As illustrated in FIG. 14B, melt intensity regions of beams of laser light of the main beam B1 and the auxiliary beam B2 do not need to overlap with each other. It is only necessary that molten pools overlap with each other. That is, it is sufficient that the melt intensity region formed with the main beam B1 can reach the anterior molten pool WPf before the molten pool formed with the auxiliary beam B2 solidifies. As described above, the power density of the main beam B1 and the auxiliary beam B2 has intensity that enables the workpiece W to melt, and the melt intensity region refers to a range around the main beam B1 or the auxiliary beam B2 of beam of laser light having power density that enables the workpiece W to melt.

In the welding apparatus according to the eleventh embodiment and the welding method using this welding apparatus, the anterior molten pool WPf exists anterior to the position to be irradiated with the main beam B1, and thus this stabilizes a state of the molten pool WP in the vicinity of the position of irradiation with the main beam B1. As described above, sputter results from scattering of molten metal, and hence, stabilizing the state of the molten pool WP in the vicinity of the position of irradiation with the main beam B1 leads to suppression of generation of sputter.

Moreover, in the welding apparatus according to the seventh embodiment and the welding method using this welding apparatus, at least a wavelength of laser light that forms the auxiliary beam B2 from among the main beam B1 and the auxiliary beam B2 (both in the present example) is a wavelength at which a reflectivity is lower than a reflectivity in an infrared range of a workpiece. Hence, it is possible to highly efficiently form the anterior molten pool WPf even with a metal material having a high reflectivity at the infrared wavelength such as copper and aluminum.

In the welding apparatus according to the seventh embodiment and the welding method using this welding apparatus, it is preferable that the power density of the auxiliary beam B2 be lower than the power density of the main beam B1. More specifically, it is preferable that the power density of the auxiliary beam B2 be equal to or less than $1 \times 10^7$ W/cm². The purpose of the auxiliary beam B2 is to form the anterior molten pool WPf anterior to the position to be irradiated with the main beam B1, and the action of the anterior molten pool WPf is to stabilize the state of the molten pool WP in the vicinity of the position of irradiation with the main beam B1. It is only necessary that the anterior molten pool WPf has a shallow depth that stabilizes the molten pool WP. Moreover, as described above, the laser light that forms the auxiliary beam B2 has a wavelength at which a reflectivity is lower than a reflectivity in an infrared range of a workpiece, and thus the reflectivity concerning the workpiece drops. Hence, no excessively high power density is necessary. When the power density of the auxiliary beam is excessively high, the auxiliary beam itself causes generation of sputter. On the other hand, the purpose of the main beam is to sufficiently melt the workpiece W and it is required to reliably weld the workpiece. In view of these matters, it is preferable that the power density of the auxiliary beam B2 be lower than the power density of the main beam B1.

An example of a cross-sectional shape of laser light for achieving the profile of power density of laser light in terms of the sweep direction of laser light on a workpiece including an auxiliary beam located anterior, in the sweep direction, to the main beam is as illustrated in each of FIGS. 3A to 3F, 11, and 12.

The laser light of the auxiliary beam B2 has power density lower than power density of the main beam B1 that is provided to perform welding, and hence, disposing the auxiliary beam B2 at positions other than the forward position does not inhibit a targeted welding operation. For example, intensity of laser light forming the main beam B1 is set to 1 kW, and intensity of laser light forming the auxiliary beam B2 is set to 300 W.

Note that although it is clear from the examples described above, an auxiliary beam P2 does not need to have a profile in which a peak value is a single point. This is because the formed molten pool is not substantially affected even when a profile has a peak value that extends over a certain region (including a line-shaped region), or a profile has peak points disposed at a certain close interval. Thus, these are not discriminated and are also called the auxiliary beam P2.

Eighth Embodiment

A welding apparatus according to an eighth embodiment can be achieved by using the welding apparatus 200 according to the second embodiment illustrated in FIG. 4.

A laser oscillator 210 is configured to be capable of oscillating multi-mode laser light, for example, having an output of several kWs. For example, the laser oscillator 210 includes a plurality of semiconductor laser elements and is configured to be capable of oscillating multi-mode laser light having an output of several kWs as a total output of the plurality of semiconductor laser elements. It is preferable that the laser oscillator 210 be configured to oscillate laser light at a wavelength in the range of 300 nm to 600 nm, as in the eighth embodiment. Further, it is more preferable to select, depending on a workpiece W, the laser oscillator 210 that oscillates a wavelength at which a reflectivity of the workpiece W drops.

In the welding apparatus according to the eighth embodiment and the welding method using this welding apparatus, at least a wavelength of laser light that forms an auxiliary beam from among a main beam and the auxiliary beam (both in the present example) is a wavelength at which a reflectivity is lower than a reflectivity in an infrared region of the workpiece. Hence, it is possible to highly efficiently form an anterior molten pool even with a metal material having a high reflectivity at the infrared wavelength such as copper and aluminum.

Ninth Embodiment

A welding apparatus according to a ninth embodiment can be achieved by using the welding apparatus 300 according to the third embodiment illustrated in FIG. 5.

An optical head 320 includes a diffractive optical element 323 serving as a beam shaper and disposed between a collimating lens 321 and a focusing lens 322. The diffractive optical element 323 is used to form laser light L such that a profile in terms of the sweep direction of power density of the laser light L on the workpiece W includes an auxiliary beam located anterior, in the sweep direction, to a main beam. That is, the diffractive optical element 323 is designed to achieve a profile of laser light suitable for carrying out the welding method of this embodiment, such as the cross-sectional shapes of the laser light illustrated as examples in FIGS. 3A to 3F, 11, and 12.

In the welding apparatus according to the ninth embodiment and the welding method using this welding apparatus, at least a wavelength of laser light that forms the auxiliary beam from among the main beam and the auxiliary beam (both in the present example) is a wavelength at which a reflectivity is lower than a reflectivity in an infrared region of a workpiece. Hence, it is possible to highly efficiently form an anterior molten pool even with a metal material having a high reflectivity at the infrared wavelength such as copper and aluminum.

Tenth Embodiment

A welding apparatus according to a tenth embodiment can be achieved by using the welding apparatus 400 according to the fourth embodiment illustrated in FIG. 6.

In the tenth embodiment, a laser oscillator 411 and a laser oscillator 412 are different laser oscillators, and may be configured to oscillate laser light having the same wavelength, or may be configured to oscillate different laser light. In that case, the laser oscillator 412 is configured such that a wavelength of laser light L2 forming an auxiliary beam from among a main beam and the auxiliary beam is a wavelength that falls in the range of 300 nm to 600 nm.

An optical head 420 is configured such that a profile of power density of laser light L1 and L2 in terms of the sweep direction of the laser light L1 and L2 on a workpiece W represents a main beam and an auxiliary beam located anterior, in the sweep direction, to the main beam. Namely, it is only necessary that, of the laser light L1 and L2 with which the optical head 420 irradiates the workpiece W, the laser light L1 is used to form the main beam, and the laser light L2 is used to form the auxiliary beam. Note that the example illustrated in the figure only uses the laser light L1 and L2; however, it is possible to increase the number of beams of laser light as appropriate to achieve a profile of laser light suitable for carrying out the welding method of this embodiment, such as the cross-sectional shapes of laser light illustrated as examples in FIGS. 3A to 3F, 11, and 12.

In the welding apparatus according to the tenth embodiment and the welding method using this welding apparatus, at least a wavelength of laser light that forms the auxiliary beam from among the main beam and the auxiliary beam is a wavelength at which a reflectivity is lower than a reflectivity in an infrared range of the workpiece. Hence, it is possible to efficiently form an anterior molten pool even with a metal material having a high reflectivity at the infrared wavelength such as copper and aluminum. On the other hand, a wavelength of the laser light L1 that forms the main beam does not need to be a wavelength at which a reflectivity is lower than the reflectivity in the infrared region of the workpiece, and hence, the laser oscillator 411 can use a high-power laser oscillator with the infrared wavelength, as with a product in the related art. That is, in the present embodiment, a wavelength of laser light that forms the auxiliary beam is a wavelength at which a reflectivity is lower than the reflectivity of the workpiece at the wavelength of the laser light that forms the main beam. In a molten state, the reflectivity drops even with a metal material having a high reflectivity at the infrared wavelength. Thus, the laser oscillator 411 can sufficiently melt the workpiece by using, for example, a high-power laser oscillator with the infrared wavelength such as a fiber laser, a YAG laser, and a disk laser.

Eleventh Embodiment

A welding apparatus according to an eleventh embodiment can be achieved by using the welding apparatus 500 according to the fifth embodiment illustrated in FIG. 7.

An optical head 520 is configured such that a profile of power density of laser light L1 and L2 in terms of the sweep direction of the laser light L1 and L2 on a workpiece W represents a main beam and an auxiliary beam located anterior, in the sweep direction, to the main beam. Namely, it is only necessary that, of the laser light L1 and L2 with which the optical head 520 irradiates the workpiece W, the laser light L1 is used to form the main beam, and the laser light L2 is used to form the auxiliary beam. Note that the example illustrated in the figure only uses the laser light L1 and L2; however, it is possible to increase the number of beams of laser light as appropriate to achieve a profile of laser light suitable for carrying out the welding method of this embodiment such as the cross-sectional shapes of laser light illustrated as examples in FIGS. 3A to 3F, 11, and 12.

In the welding apparatus according to the eleventh embodiment and the welding method using this welding apparatus, at least a wavelength of laser light that forms the auxiliary beam from among the main beam and the auxiliary beam (both in the present example) is a wavelength at which a reflectivity is lower than a reflectivity in an infrared range of the workpiece. Hence, it is possible to efficiently form an anterior molten pool even with a metal material having a high reflectivity at the infrared wavelength such as copper and aluminum.

Twelfth Embodiment

A welding apparatus according to a twelfth embodiment can be achieved by using the welding apparatus 600 according to the sixth embodiment illustrated in FIG. 8.

In the twelfth embodiment, a laser oscillator 611 and a laser oscillator 612 are different laser oscillators and may oscillate laser light having the same wavelength, but may be configured to oscillate different laser light. In that case, the laser oscillator 612 is configured such that a wavelength of a laser light that forms an auxiliary beam from among a main beam and the auxiliary beam is a wavelength that falls in the range of 300 nm to 600 nm.

In the twelfth embodiment, beams of the laser light oscillated in the laser oscillators 611 and 612 are combined before being guided to an optical head 620. For this purpose, a combining portion 634 is provided between optical fibers 631, 632, and 635, each of which guides the laser light oscillated in the laser oscillators 611 and 612 to the optical head 620, and the laser light oscillated in the laser oscillators 611 and 612 is guided in parallel in the optical fiber 635.

The optical head 620 is an optical apparatus for concentrating laser light L combined by the combining portion 634 to such a power density that is sufficient to melt a workpiece W, and for irradiating the workpiece W with the laser light L. For this purpose, the optical head 620 includes a collimating lens 621 and a focusing lens 622.

In the present embodiment, the optical head 620 does not include any beam shaper, and also does not include any independent optical system for a plurality of beams of laser light. However, the beams of the laser light oscillated in the laser oscillators 611 and 612 are combined before being guided to the optical head 620. Thus, a profile of power density of the laser light L in terms of the sweep direction of the laser light L on the workpiece W is configured to represent a main beam and an auxiliary beam located at a position anterior, in the sweep direction, to the main beam.

In the welding apparatus according to the twelfth embodiment and a welding method using this welding apparatus, at least a wavelength of laser light that forms the auxiliary beam from among the main beam and the auxiliary beam is a wavelength at which a reflectively is lower than a reflectivity in an infrared region of the workpiece. Hence, it is possible to efficiently form an anterior molten pool even with a metal material having a high reflectivity at the infrared wavelength such as copper and aluminum. On the other hand, a wavelength of the laser light L1 that forms the main beam does not need to be a wavelength at which a reflectivity is lower than the reflectivity in the infrared region of the workpiece, and hence, the laser oscillator 611 can use a high-power laser oscillator with the infrared wavelength, as with a product in the related art. That is, in the present embodiment, the wavelength of the laser light that forms the auxiliary beam is a wavelength at which a reflectivity is lower than the reflectivity of the workpiece at the wavelength of the laser light that forms the main beam. In the molten state, the reflectivity drops even with a metal material having a high reflectivity at the infrared wavelength. Thus, the laser oscillator 611 can sufficiently melt the workpiece by using, for example, a high-power laser oscillator with the infrared wavelength such as a fiber laser, a YAG laser, and a disk laser.

In all the embodiments described above, the welded form based on the main beam is not limited to that of heat conductive welding but also may be that of keyhole welding.

Second Verification Experiment

Here, the results of a second verification experiment concerning the effect of the disclosure will be described. An apparatus configuration used in this second verification experiment is the configuration of the welding apparatus according to the seventh embodiment and is the same configuration as that of the welding apparatus 100. A first experimental condition serving as a comparative example includes a configuration in which the diffractive optical element 123 is omitted from the welding apparatus 100. A second experimental condition corresponding to the disclosure includes a configuration in which a diffractive optical element 123 is provided and designed to irradiate a workpiece W with laser light with a profile in which an irradiated surface shape is as that illustrated in FIG. 10, but a wavelength of the laser light used is in a blue color region. Note that as conditions shared among experiments, a sweep rate between the optical head 120 and the workpiece W is 5 m per minute, and nitrogen gas is used as a shielding gas. Note that as the workpiece W, a tough pitch copper having a thickness of 2 mm is used.

More specifically, under the first experimental condition, a multi-mode fiber laser element having an oscillation wavelength 1070 nm is used as the laser oscillator 110, and this is used at an output of 3 kW. Then, irradiation is performed on the workpiece as a spot without passing through the diffractive optical element 123, and thus a spot diameter of a light gathering point is 100 μm, and average power density of this is set to $3.8 \times 10^7$ W/cm$^2$.

Under the second experimental condition, a semiconductor laser element having an oscillation wavelength of 450 nm is used as the laser oscillator 110, and this is used at an output of 1 kW. The diffractive optical element 123 used is designed to irradiate the workpiece W with laser light having an irradiated surface shape as illustrated in FIG. 10. As for distribution of the output, 300 W from the output of 1 kW is almost evenly distributed over the semicircular-shaped auxiliary beam. At this time, average power density of the main beam is $2.2 \times 10^6$ W/cm$^2$ and average power density of the auxiliary beam is $8.0 \times 10^4$ W/cm$^2$.

Under the above-described experimental conditions, verification experiments were performed, and the following results were obtained.

Under the first experimental condition, power density of the light gathering point exceeded a melting threshold of pure copper to form a keyhole, and welding was able to be performed. However, at the same time, sputter and welding defects were generated frequently.

On the other hand, under the second experimental condition, the output of the laser oscillator was 1 kW, but since the copper material has a high absorption rate at a wavelength of 450 nm, welding was able to be performed up to a desired depth. Moreover, an anterior molten pool was able to be formed with the semicircular-shaped auxiliary beam having 300 W and disposed anteriorly in the sweep direction. As a result, it was confirmed from observation using a high-speed camera that due to the effect of the anterior melt pool formed with the auxiliary beam, sputter and welding defects significantly drop to approximately 20% or less.

This verification experiment also confirms that the effect of suppressing generation of sputter can be obtained from the welding apparatus in which the profile in terms of the moving direction of power density of the laser light L on the workpiece W includes the auxiliary beam disposed anterior, in the moving direction, to the main beam, and at least the wavelength of laser light that forms the auxiliary beam from among the main beam and the auxiliary beam is a wavelength at which a reflectivity is lower than the reflectivity in the infrared region of the workpiece, and can be obtained from the welding method using this welding apparatus.

The disclosure is described based on the embodiments. However, the disclosure is not limited by the embodiments described above. Configurations made by appropriately combining constituent elements in the respective embodiments described above are also in the scope of the disclosure. In addition, a person skilled in the art can easily derive further effects or modification examples. Thus, the broader aspects of the disclosure are not limited to the above-described embodiments, and various modifications can be made.

A welding method and a welding apparatus according to the disclosure provide an effect of enabling suppression of generation of sputter.

What is claimed is:

1. A method of welding a workpiece by using a laser, the method comprising:
disposing a workpiece in a region to be irradiated with laser light from at least one laser oscillator; and
irradiating the workpiece with the laser light from the laser oscillator such that an irradiated portion of the workpiece is melted and welded while sweeping the laser light over the workpiece by moving the laser light and the workpiece relative to each other, wherein:
the laser light is formed of a main beam and an auxiliary beam, at least part of the auxiliary beam being disposed anteriorly in a sweep direction of the laser light so that at least a part of the auxiliary beam is first irradiated to the workpiece and the main beam is next irradiated to the workpiece,
the auxiliary beam has a power density that causes the workpiece to melt under a presence of the main beam or with the auxiliary beam alone to form a molten pool, in which the workpiece is melted,
the main beam has a power density, that is greater than the power density of the auxiliary beam and that causes the keyhole, and
the main beam is irradiated to the workpiece before the molten pool, formed by the auxiliary beam, soldifies,
the laser light forms a shallow region in a region to be irradiated by the at least one auxiliary beam, the shallow region being a molten pool shallower than a molten pool formed in a region to be irradiated by the main beam,
a melt density region of the main beam reaches the shallow region before the shallow region formed in the region to be irradiated by the at least one auxiliary beam solidifies;
the power density of the auxiliary beam has an intensity to melt the workpiece, and suppress generation of sputter, and
a depth of the shallow region is equal to or greater than 10 μm and is equal to or less than 200 μm.

2. The welding method according to claim 1, wherein the irradiating comprises irradiating the workpiece such that a keyhole is at least generated in the irradiated portion of the workpiece.

3. The welding method according to claim 1, wherein the laser light further includes another auxiliary beam having a power density lower than the power density of the main beam and disposed posterior, in a sweep direction, to the main beam.

4. The welding method according to claim 1, wherein the laser light further includes a yet another auxiliary beam having the power density lower than the power density of the main beam and disposed sideward in a sweep direction of the main beam.

5. The welding method according to claim 1, wherein the laser light further includes a plurality of auxiliary beams including the auxiliary beam and an additional auxiliary beam each having a power density lower than the power density of the main beam and dispersed around the main beam.

6. The welding method according to claim 1, wherein the auxiliary beam has a ring shape surrounding the main beam, or an arc shape partially surrounding the main beam.

7. The welding method according to claim 1, wherein the main beam and the auxiliary beam of the laser light are configured such that a first molten pool formed with the main beam and a second molten pool folioed with the auxiliary beam at least partially overlap with each other.

8. The welding method according to claim 1, wherein the main beam and the auxiliary beam are generated from laser light emitted from a single laser oscillator.

9. The welding method according to claim 1, wherein the main beam and the auxiliary beam are formed by a beam shaper disposed between the laser oscillator and the workpiece.

10. The welding method according to claim 9, wherein the beam shaper is a diffractive optical element.

11. The welding method according to claim 1, wherein
the workpiece includes at least two members to be welded, and
the workpiece is disposed in a region to be irradiated with the laser light in the disposing step such that the at least two members are overlapped with each other, or brought into contact with each other, or adjacent to each other.

12. The welding method according to claim 1, wherein the auxiliary beam has a beam diameter equal to or greater than a beam diameter of the main beam.

13. The method of claim 1, wherein the power density of the auxiliary beam is less than or equal to $1\times10^7$ W/cm$^2$.

* * * * *